(12) United States Patent
Adachi et al.

(10) Patent No.: US 10,004,069 B2
(45) Date of Patent: *Jun. 19, 2018

(54) WIRELESS TERMINAL

(71) Applicant: KABUSHIKI KAISHA TOSHIBA, Tokyo (JP)

(72) Inventors: Tomoko Adachi, Tokyo (JP); Tetsu Nakajima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/716,081

(22) Filed: May 19, 2015

(65) Prior Publication Data

US 2015/0264685 A1    Sep. 17, 2015

Related U.S. Application Data

(63) Continuation of application No. 13/183,883, filed on Jul. 15, 2011, now Pat. No. 9,042,313, which is a
(Continued)

(30) Foreign Application Priority Data

Jan. 16, 2009 (JP) ................. 2009-007933

(51) Int. Cl.
*H04W 72/04* (2009.01)
*H04W 48/08* (2009.01)
(Continued)

(52) U.S. Cl.
CPC ....... *H04W 72/0446* (2013.01); *H04W 48/08* (2013.01); *H04W 68/00* (2013.01); *H04W 84/12* (2013.01); *H04W 88/02* (2013.01)

(58) Field of Classification Search
CPC .................................. H04W 72/0446
See application file for complete search history.

(56) References Cited

U.S. PATENT DOCUMENTS 6,212,173 B1    4/2001 Lindsay et al.
6,389,066 B1    5/2002 Ejzak
(Continued)

FOREIGN PATENT DOCUMENTS

JP    2001-28614        1/2001
JP    2003-229784 A    8/2003
(Continued)

OTHER PUBLICATIONS

International Search Report dated Apr. 20, 2010 in PCT/JP2010/050404, filed Jan. 15, 2010.
(Continued)

*Primary Examiner* — Hong Cho
(74) *Attorney, Agent, or Firm* — Oblon, McClelland, Maier & Neustadt, L.L.P.

(57) ABSTRACT

There is provided a wireless terminal including: a frame allocating unit performing an allocation process on a frame to be transmitted to another wireless terminal; a first communication unit assigning a sequence number to the allocated frame and transmitting the frame to the another wireless terminal through a first channel or a first mode; a second communication unit assigning a sequence number to the allocated frame and transmitting the frame to the another wireless terminal through a second channel or a second mode, wherein the allocating unit allocates the frame to one of the first and second communication units; when changing the transmission source of the frame from the one to the other communication unit, a change notification frame including a transmission starting sequence number is transmitted to the another wireless terminal; and the frame
(Continued)

allocating unit switches the allocation destination of the frame from the one to the other.

18 Claims, 20 Drawing Sheets

Related U.S. Application Data continuation of application No. PCT/JP2010/050404, filed on Jan. 15, 2010.

(51) Int. Cl.
*H04W 68/00* (2009.01)
*H04W 84/12* (2009.01)
*H04W 88/02* (2009.01)

(56) References Cited

U.S. PATENT DOCUMENTS

| | | | | |
|---|---|---|---|---|
| 7,401,159 | B1 * | 7/2008 | Aviani | H04L 67/1008 370/230.1 |
| 7,554,917 | B1 * | 6/2009 | Tieu | H04L 1/1809 370/235 |
| 7,603,418 | B1 * | 10/2009 | Xu | H04L 45/00 370/229 |
| 8,311,027 | B2 | 11/2012 | Padovani et al. | |
| 2001/0055311 | A1 | 12/2001 | Trachewsky et al. | |
| 2004/0218563 | A1 * | 11/2004 | Porter | H04W 16/04 370/329 |
| 2005/0002421 | A1 | 1/2005 | Ito et al. | |
| 2005/0208956 | A1 * | 9/2005 | Takagi | H04W 74/0816 455/464 |
| 2006/0114928 | A1 * | 6/2006 | Utsunomiya | H04W 74/0808 370/448 |
| 2008/0151849 | A1 * | 6/2008 | Utsunomiya | H04W 72/0486 370/338 |
| 2008/0181192 | A1 * | 7/2008 | Nabetani | H04W 72/02 370/345 |
| 2009/0010199 | A1 | 1/2009 | Adachi et al. | |
| 2009/0323608 | A1 | 12/2009 | Adachi et al. | |
| 2012/0051220 | A1 * | 3/2012 | Nabetani | H04W 74/0816 370/235 |

FOREIGN PATENT DOCUMENTS

| | | |
|---|---|---|
| JP | 2004-350259 | 12/2004 |
| JP | 2005-229201 A | 8/2005 |
| JP | 2006-345323 | 12/2006 |
| JP | 2007-89019 A | 4/2007 |
| JP | 2010-11397 A | 1/2010 |
| JP | 2010-114774 A | 5/2010 |
| JP | 2010-130280 A | 6/2010 |
| JP | 2010-135909 A | 6/2010 |

OTHER PUBLICATIONS

International Preliminary Report on Patentability and Written Opinion dated Aug. 16, 2011 in PCT/JP2010/050404.
Japanese Office Action dated Oct. 12, 2012, in Japan Patent Application No. 2009-007933 (with English translation).
Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-Speed Physical Layer in the 5 GHz Band, IEEE Computer Society, IEEE Std 802.11a-1999(R2003), Reaffirmed Jun. 12, 2003, 91 pages.
Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, IEEE Computer Society, IEEE Std 8O2.11b-1999(R2003), Reaffirmation Jun. 12, 2003, Approved Sep. 16, 1999, 96 pages.
IEEE Standard for Information technology—Telecommunications and information exchange between systems—Local and metropolitan area networks—Specific requirements, Part 11: Wireless LAN Medium Access Control (MAC) and Physical Layer (PHY) specifications Amendment 4: Further Higher Data Rate Extension in the 2.4 GHz Band, IEEE Computer Society, IEEE Std 802.11g™-2003, Jun. 27, 2003, 78 pages.
IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), IEEE Computer Society, IEEE Std 802.15.3™-2003, Sep. 29, 2003, 324 pages.
IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension, IEEE Computer Society, IEEE Std 802.15.3c™-2009, Oct. 12, 2009, 200 pages.
Office Action dated Apr. 15, 2016 in Japanese Patent Application No. 2014-126588 (with unedited computer generated English translation).

* cited by examiner

US 10,004,069 B2

WIRELESS TERMINAL

CROSS REFERENCE TO RELATED APPLICATIONS

This application is a continuation of U.S. application Ser. No. 13/183,883 filed Jul. 15, 2011, which is based upon and claims the benefit of PCT International Application PCT/JP2010/050404, filed on Jan. 15, 2010, which claims the benefit priority from the prior Japanese Patent No. 2009-7933, filed on Jan. 16, 2009. The entire contents of each of which are incorporated herein by reference.

FIELD

The embodiments of this invention relate to a wireless terminal having two or more transceivers each having a different channel or mode and relate to a wireless communication method for the wireless terminal, e.g., a method for changing the transceiver for transmitting and receiving frames between the wireless terminals in communication with each other.

BACKGROUND

Conventionally, it has been suggested to transmit frames between wireless terminals through a plurality of channels when there are a plurality of channel links between the wireless terminals. For example, JP-A 2004-350259 (Kokai) discloses that different frames can be simultaneously transmitted through two channels.

In the above conventional technique, when trying to enable the wireless terminal on the receiving side to receive frames in the order of their sequence numbers through a plurality of channels, restrictions are placed on transmitter configuration since the unit (or process step) for setting the frame order (sequence number) in the transmission process of the transmitter cannot be freely set.

The embodiments of this invention have been made to solve the above problem, and the object thereof is to provide a wireless terminal and a wireless communication method for enabling the wireless terminal on the receiving side to receive frames in sequence when the frames are transmitted through a plurality of channels, while ensuring a flexible transmitter configuration.

The embodiments of the present invention make it possible to enable the wireless terminal on the receiving side to receive frames in sequence when the frames are transmitted through a plurality of channels, while ensuring a flexible transmitter configuration.

SUMMARY

According to an aspect of embodiments, there is provided a wireless terminal which communicates with another wireless terminal, including:

a frame allocating unit configured to perform an allocation process on a frame to be transmitted to the another wireless terminal;

a first communication unit configured to have a first sequence number assigning unit assigning a sequence number to the frame allocated to the first communication unit by the frame allocating unit and transmit the frame assigned with the sequence number to the another wireless terminal through a first channel or a first mode; and a second communication unit configured to have a second sequence number assigning unit assigning a sequence number to the frame allocated to the second communication unit by the frame allocating unit and transmit the frame assigned with the sequence number by the second sequence number assigning unit to the another wireless terminal through a second channel or a second mode;

wherein the frame allocating unit allocates the frame to one of the first and second communication units, when a transmission source of the frame is changed from the one communication unit to the other communication unit, the first communication unit or the second communication unit transmits, to the another wireless terminal, a change notification frame notifying that a transmission channel or a transmission mode of the frame is to be changed from the channel or mode of the one communication unit to the channel or mode of the other communication unit, wherein the change notification frame includes a transmission starting sequence number being a sequence number with which transmission is started at the other communication unit, and the frame allocating unit switches an allocation destination of the frame from the one communication unit to the other communication unit.

THE EFFECT BY THE EMBODIMENTS

The embodiments of the present invention make it possible to enable the wireless terminal on the receiving side to receive frames in sequence when the frames are transmitted through a plurality of channels, while ensuring a flexible transmitter configuration.

DETAILED DESCRIPTION

Figure 1:
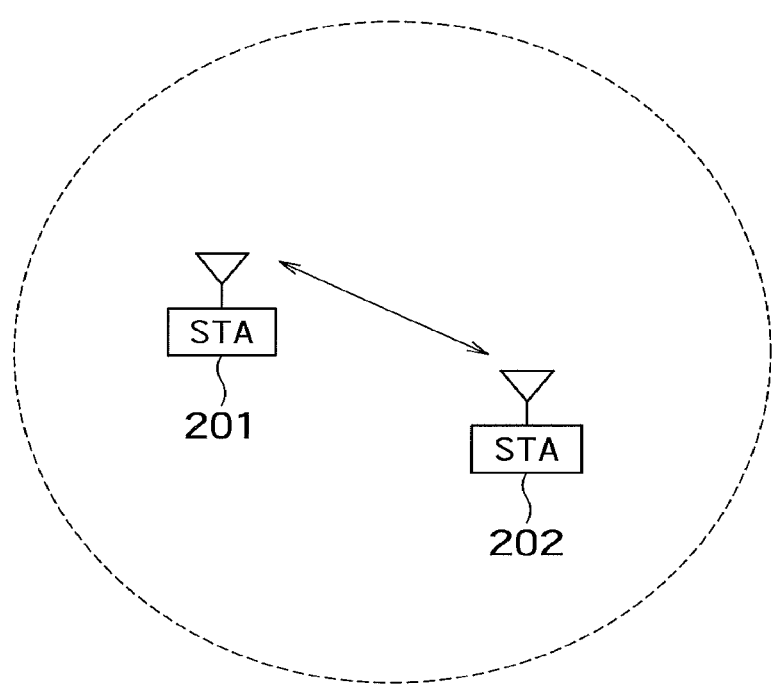
FIG. 1 is a diagram showing an example of how to connect wireless terminals according to an embodiment.

Hereinafter, the present embodiment will be explained in detail referring to the drawings.

FIG. 1 shows an example of how to connect wireless terminals according to an embodiment of the present invention. In FIG. 1, two wireless terminal, namely a wireless terminal 201 (STA 201) and a wireless terminal 202 (STA 202) are connected to each other. The number of wireless terminals is not limited to two. When there are more than two wireless terminals, each wireless terminal may be connected to other wireless terminals.

Figure 2:
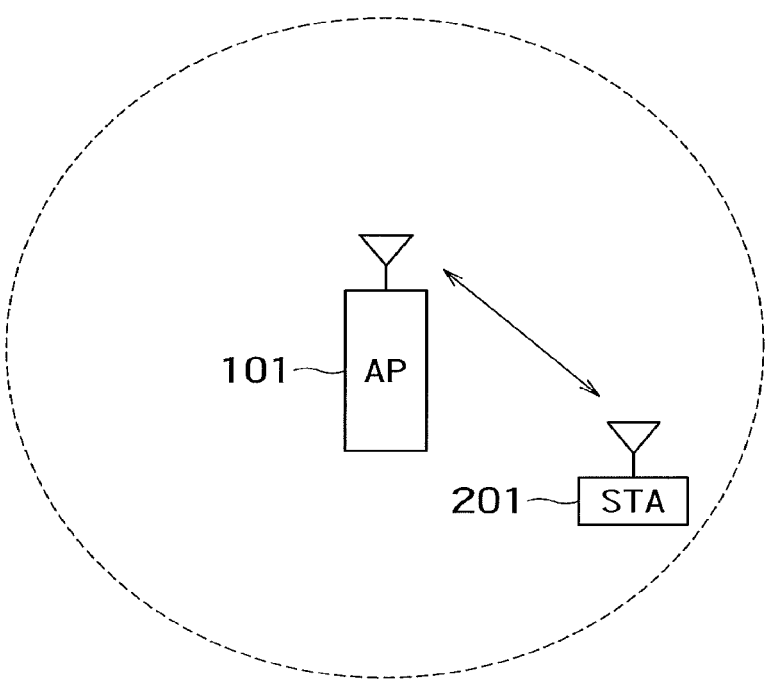
FIG. 2 is a diagram showing another example of how to connect wireless terminals according to an embodiment.

Further, as shown in FIG. 2, one of the two wireless terminals may be a wireless base station. In FIG. 2, a wireless base station 101 (AP 101) is connected with the wireless terminal 201 (STA 201.) The wireless base station 101 may be connected with one or more wireless terminals other than the wireless terminal 201, may be connected with one or more other wireless base stations, and further may be connected to a wired network. The wireless terminal 201 may be connected to one or more wireless terminals other than the wireless base station 101. Hereinafter, a wireless base station is described as a wireless terminal if not particularly distinguished.

<Definition of Wireless Communication Group (BSS)>

In an IEEE 802.11 wireless LAN, a wireless communication group formed as shown in FIG. 2 and FIG. 1 is called a BSS (Basic Service Set.)

<Definition of Connection>

The "connection" between wireless terminals is the state where each terminal recognizes the existence of another terminal and grasps another terminal's capability for realizing a certain type of wireless communication. In order to grasp one another's capability, each wireless terminal notifies its capability to another wireless terminal, for example. As one means, there is an authentication process. In an IEEE 802.11 wireless LAN system, the authentication process corresponds to such as "Association Process" where management frames called Association Request and Association Response frames are exchanged. As another means for grasping the capability of one another, each wireless terminal transmits a frame notifying its capability. In the IEEE 802.11 wireless LAN system, when a wireless terminal transmits a management frame called a Beacon frame serving as a synchronization signal while showing the attributes of the communication group (BSS) for example, as there is also a field included to notify the capability of the wireless terminal itself which transmitted the Beacon frame, another wireless terminal receiving the Beacon frame can grasp the capability of the wireless terminal. Further, as a management frame similar to the Beacon frame, there is a Probe Response frame, which can be obtained as a response when transmitting a Probe Request frame. By using this Probe Response frame, the capability of the wireless terminal serving as a transmission source can be grasped. Wireless communication can be established between the wireless terminals connected to each other.

<Configuration of Wireless Terminal>

Figure 3:
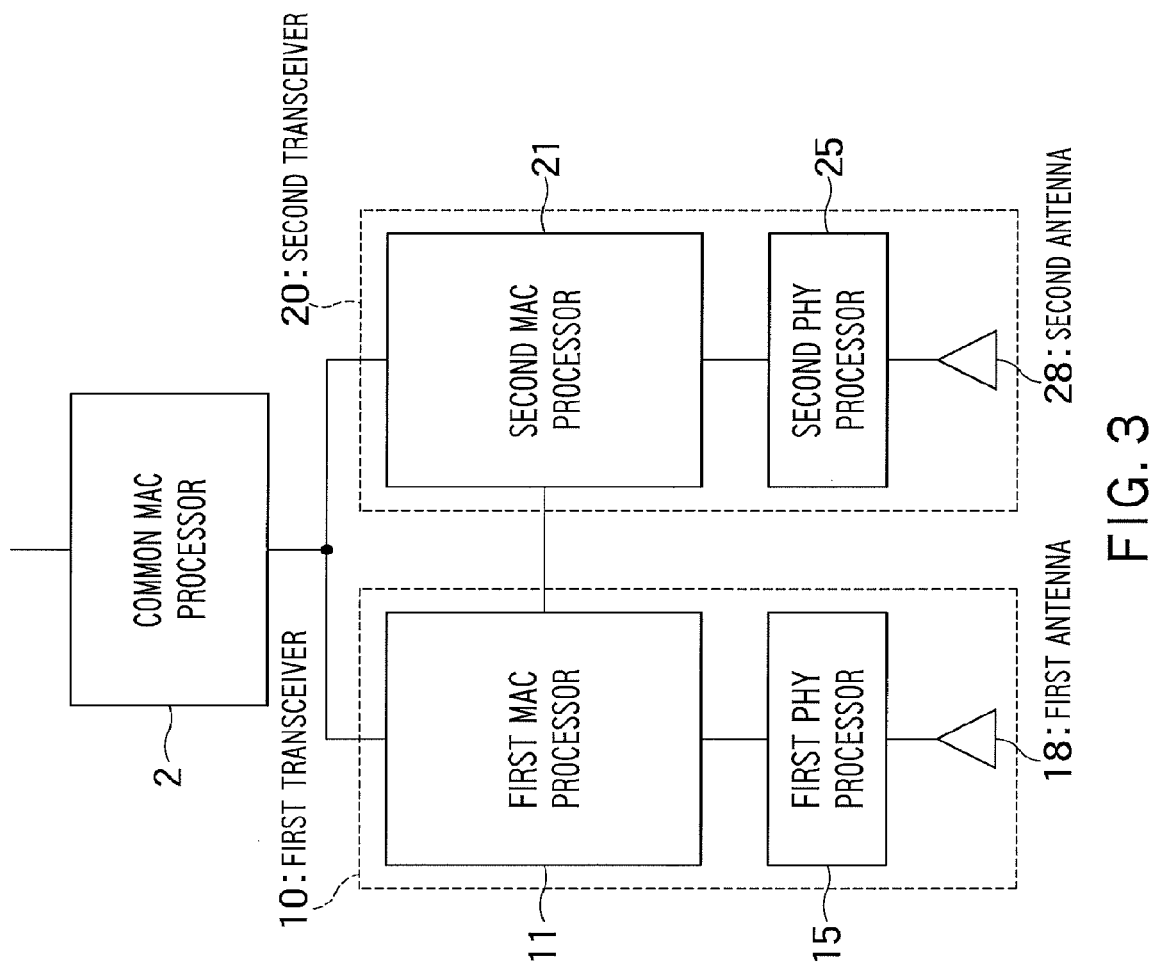
FIG. 3 is a diagram showing a structural example of a wireless terminal according to an embodiment.

FIG. 3 shows a structural example of a wireless terminal according to an embodiment. In FIG. 3, the elements of the wireless terminal may be formed as hardware, software module, or their combination.

As shown in FIG. 3, a common MAC processor (frame allocating unit) 2 is connected to a first transceiver (first communication unit) 10 and a second transceiver (second communication unit) 20. The common MAC processor 2 allocates data generated through e.g., a Logical Link Control (LLC) layer defined by the IEEE 802 standards to the first transceiver 10 or the second transceiver 20. Further, the common MAC processor 2 passes the transmission status of the frame transmitted from the first transceiver 10 or the second transceiver 20 back to the LLC layer. Furthermore, the common MAC processor 2 performs control to transfer the contents (payload) of the frame received through the first transceiver 10 or the second transceiver 20 to the LLC layer. When the wireless terminal is a wireless base station, the common MAC processor 2 may be connected to a wired network.

<First Transceiver 10 and Second Transceiver 20>

The first transceiver 10 and the second transceiver 20 use different channels respectively. The channel used by the first transceiver 10 corresponds to a first channel, and the channel used by the second transceiver 20 corresponds to a second channel. The term "channel" means a channel divided mainly in terms of frequency, but a channel based on code division may also be employed. As stated above, the wireless terminal of the present embodiment is a wireless terminal compatible with a plurality of channels, namely a multichannel wireless terminal.

The first transceiver 10 and the second transceiver may be distinguished from each other based on a frequency band having a plurality of frequency channels. For example, the first transceiver 10 uses any one of channels in 5 GHz band based on IEEE 802.11a, and the second transceiver 20 uses any one of channels in 2.4 GHz band based on IEEE 802.11b/g. The channels in 5 GHz band and 2.4 GHz band are not required to be fixed, and each channel may be changed within its frequency band. In this case, a concrete transmission and reception system is different depending on IEEE 802.11a, IEEE 802.11b, and IEEE 802.11g, and thus the wireless terminal of the present embodiment can be called a multimode wireless terminal compatible with not only different channels but also different transmission and reception systems. Further, the transmission and reception systems of the first transceiver 10 and the second transceiver 20 may be drastically different from each other. For example, the first transceiver 10 corresponds to 60 GHz band based on IEEE 802.15.3c standard for wireless PAN, and the second transceiver 20 corresponds to 5 GHz band based on IEEE 802.11a standard for wireless LAN.

The first transceiver 10 includes: a first MAC (Media Access Control) processor 11; a first PHY processor 15; and a first antenna 18.

The second transceiver 20 includes: a second MAC processor 21; a second PHY processor 25; and a second antenna 28.

The first MAC processor 11 and the second MAC processor 21 are connected to the common MAC processor 2, and each MAC processor performs the following processes for example: generating a MAC frame; performing access control at the time of transmission; receiving a frame (and transmitting a response frame, etc.); and managing the settings between the wireless terminals. These are, for example, MAC layer operations specified in the IEEE 802.11 wireless LAN system (including a series of expansive/complementary standards such as 802.11a, b, e, g, h, i, j, and n, which can be applied hereinafter) and/or the IEEE 802.15 wireless PAN system (including a series of expansive/complementary standards such as 802.15.3 and 802.15.3c). Further, each of the MAC processors 11 and 21 may have a work area or a frame buffer, and further may have a memory for storing wireless terminal information etc. These components may be arranged not in but outside the MAC processors 11 and 21 so that the components can be used in the process other than that for the MAC layer.

For example, management information shared between the first transceiver 10 and the second transceiver 20, such as the information concerning the wireless terminal to be connected to both of the transceivers 10 and 20, may be retained in the common MAC processor 2. The wireless terminal to be connected is a multichannel wireless terminal or a multimode wireless terminal capable of communicating with both of the first and second transceivers. In this case, for example, the first/second MAC processors 11/21 may separately retain setting information of the wireless terminal required when the first/the second transceivers 10/20 establish connection. The common MAC processor 2 may give judgment on which of the first transceiver 10 and second transceiver 20 should be used for transmission, based on the terminal information controlled therein or the information acquired from the first/second MAC processors 11/21 as necessary.

Further, in FIG. 3, the first MAC processor 11 and the second MAC processor 21 may be connected through the common MAC processor 2, instead of being directly connected to each other.

The first PHY processor 15 and the second PHY processor 25 are connected to the first MAC processor 11 and the second MAC processor 21 respectively, and each PHY processor performs the following processes for example: generating a PHY packet from the MAC frame; modulation encoding; grasping the state of a wireless medium (air); demodulating and decoding a received signal; and notifying a received packet or the information and a reception state to the MAC processor. These are, for example, PHY layer operations specified in the IEEE 802.11 wireless LAN system and/or the IEEE 802.15 wireless PAN system. Further, the PHY processor 15/25 performs digital/analog conversion on a transmission signal and gradually converts the frequency of the signal in order to radiate a transmission packet as radio waves from the first/second antenna 18/28. Furthermore, when inputted with received radio waves from the first/second antenna 18/28, the PHY processor 15/25 gradually converts the frequency of the received signal and performs analog/digital conversion thereon.

For example, data inputted from the LLC layer are allocated to the first transceiver 10 or the second transceiver 20 by the common MAC processor 2, converted into MAC frames by the MAC processor (first MAC processor 11 or second MAC processor 21) in the corresponding transceiver, converted into PHY packets and further converted into analog signals by the PHY processor (first PHY processor 15 or second PHY processor 25), and transmitted from the antenna (first antenna 18 or second antenna 28) as radio signals. To the contrary, radio signals received by the antenna (first antenna 18 or second antenna 28) are processed through the PHY processor (first PHY processor 15 or second PHY processor 25), the MAC processor (first MAC processor 11 or second MAC processor 21), and the common MAC processor 2, and data addressed to the terminal concerned are outputted to an upper layer such as the LLC layer.

As stated above, the wireless terminal of the present embodiment is a multichannel wireless terminal or a multimode wireless terminal having the first transceiver and the second transceiver.

Note that the system as shown in FIG. 1 or FIG. 2 may be formed only of the multichannel/multimode wireless terminals of the present application, or may include a non-multichannel/non-multimode wireless terminal. When a non-multichannel/non-multimode wireless terminal is included, the embodiment of the present invention is based on the situation where the frames are transmitted and received between the multichannel/multimode wireless terminals using a plurality of channels.

<Frames Processed by MAC Processor Based on 802.11>
<MAC Frame>

In the IEEE 802.11 wireless LAN, generally, there are three types of MAC frames, namely a data frame, a management frame, and a control frame. The type is shown in a type field in a frame control field of a MAC header. Further, the frame control field has a subtype field to distinguish each of the frames within the same frame type.

The data frame is basically a frame generated from the data inputted from the upper layer (e.g., LLC layer) of the MAC layer. In some cases, null data is generated in the MAC layer and the frame to be subsequently generated is treated as a data frame.

The management frame is a frame for transmitting the management information of the MAC layer level. The management frame includes the following frames, for example: a Beacon frame, a Probe Request frame, a Probe Response frame, an Association Request frame, an Association Response frame, etc.

The control frame is a frame used for performing access control in the MAC layer. The control frame includes the following frames, for example: an RTS frame for reserving a channel before transmitting the data frame or management frame; a CTS frame responding to the RTS frame (the CTS frame may be solely transmitted in order to directly reserve the channel); an ACK (Acknowledgment) frame for sequentially responding to the data frame or management frame as a delivery confirmation frame; a BA (Block Acknowledgment) frame for simultaneously responding to a plurality of data frames; and a BAR (Block Acknowledgment Request) frame for requesting the BA frame.

Figure 4:
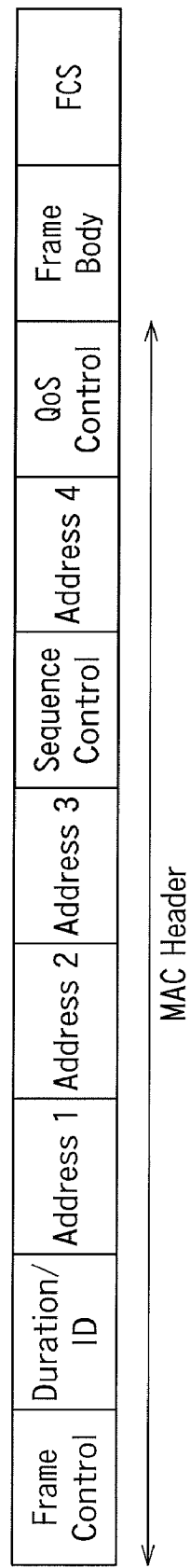
FIG. 4 is a diagram showing a format example of an IEEE 802.11 MAC frame.

The MAC frame based on IEEE 802.11 is passed to the PHY layer as an MPDU having the frame format as shown in FIG. 4. FIG. 4 shows a general frame format, and some fields may be removed depending on the frame format. Note that the data frame before having such a frame format is called MSDU (MAC Service Data Unit), and the management frame before having such a frame format is called MMPDU (MAC Management Protocol Data Unit.)

<Sequence Number>

Each of the MSDU and MMPDU is assigned with a sequence number showing the order of the frame. Concretely, when the MPDU is generated, the order is described in a sequence number field in a sequence control field of the MAC header. Specifically, in the case of a QoS data frame having a traffic type (Traffic IDentifier: TID), the a counter corresponding to each direct transmission destination address is arranged with respect to each TID to increase the sequence numbers of the frames one by one. In the case of a QoS Null frame for transmitting the null data generated in the MAC layer (a QoS (+) Null frame given by an ACK response may be employed), the sequence number may have an arbitrary value. This is because the process is completed in the MAC layer. MMPDUs are assigned with sequence numbers by a counter different from those of MSDUs.

Further, when generating an MPDU, each of the MSDU and MMPDU may be divided into fragments having a short frame length (fragmentation process), as necessary. In this case, a fragment number is assigned to a fragment number field in the sequence control field of the MAC header so that the wireless terminal on the receiving side can reconstruct (defragmentation process) the MSDU and MMPDU.

<Receiving Process>

In the 802.11 wireless LAN, for example, a frame check sequence (FCS) is arranged at the end of the frame in order to judge whether the frame is correctly received without errors. For example, in a general MAC frame format in the IEEE 802.11 wireless LAN (see FIG. 4), the FCS at the end is formed of a cyclic redundancy code (CRC), which is a value calculated based on the MAC header and a Frame Body field storing data such as those passed from the LLC layer. The wireless terminal on the receiving side checks the CRC, and when an error is detected, the subsequent receiving process, such as extracting the address of the transmission destination wireless terminal, are not performed. In this case, access to the channel is performed basically after an EIFS (Extended InterFrame Space), which is a fixed period of time showing the longest expected time to transmit a delivery confirmation response (ACK frame mentioned later.) When no error is detected after the CRC check, the subsequent receiving process is performed. For example, when the terminal concerned does not correspond to the direct transmission destination address, NAV (Network Allocation Vector) is set in order to perform virtual carrier sense for a certain period of time based on the duration/ID field and subtype field described in the MAC header.

In the case of a data frame or a management frame, when the wireless terminal on the receiving side recognizes that it corresponds to the direct transmission destination (Receiver Address: RA) based on an address field (explained in detail later) of the MAC header of the MPDU, the wireless terminal transmits e.g., an acknowledgment (ACK) frame serving as a delivery confirmation response transmitted with respect to each MPDU after a fixed period of time called SIFS (Short InterFrame Space) if necessary. Further, with respect to such a received frame, the wireless terminal extracts the direct transmission destination address from the address field, and rearranges the MPDUs in the order of their fragment numbers when the MPDUs are transmitted from the same wireless terminal, have the same value in the sequence number field of the MAC header, and have different values in the fragment number field, by which a data frame is reconstructed based on the unit of MSDU and a management frame is reconstructed based on the unit of MMPDU (defragmentation process.) Then, the subsequent receiving process is performed in the order of the sequence numbers. For example, when the terminal concerned corresponds to the final destination (Destination Address: DA) of a data frame, the receiving process means passing the frame body field after the defragmentation process as a payload from the MAC layer to the upper layer by using a service primitive called MA-UNITDATA.indication. In a management frame, the direct transmission destination address and the final destination address are the same (RA=DA), and when the wireless terminal concerned corresponds to the final destination address, the process of the management frame is performed in the order of the sequence numbers.

<Explanation of Address Field>

In the IEEE 802.11 wireless LAN, the address of the wireless terminal serving as the direct transmission destination is written in the first address field (Address 1 field in FIG. 4) of the MAC header. The place to set the final destination address changes depending on the situation, and is Address 1 or Address 3 when the final destination is different from the direct destination address. When the final destination address and the direct transmission destination address are the same (DA=RA), the final destination address may be described in the Address 1 field. Note that, in the IEEE 802.11 wireless LAN, the address of the wireless terminal serving as the direct transmission source of the frame is written in the second address field (Address 2 field in FIG. 4) of the MAC header.

<Same Communication Group (BSSID)>

Further, in the IEEE 802.11 wireless LAN, with respect to the frame exchanged in the same wireless communication group (BSS), the identifier of the wireless communication group (BSS Identifier: BSSID) is written in the address field (any one of the Address 1 field, Address 2 field, and Address field.) Which address field should include the identifier of the wireless communication group is determined depending on the function of each transmission/reception wireless terminal in the wireless communication group.

<Definition of Wireless Base Station>

Here, a wireless base station can be regarded as a wireless terminal capable of transferring the data from another terminal (including not only a wireless terminal but also a terminal connected to a wired network, and further including another wireless base station.) For example, in the IEEE 802.11 wireless LAN, one wireless communication system (Extended Service Set; ESS) can be constructed by combining some wireless communication groups. Then, the connection among the wireless communication groups in this wireless communication system is called a distributed system (DS.) The DS may be a wired system or a wireless system, and the wireless base station can be defined as a wireless terminal which can be connected to the DS.

<Example of Field Having Identifier of Communication Group>

In the IEEE 802.11 wireless LAN, the address of the wireless base station is used as the identifier of the wireless communication group. Accordingly, for example, when the wireless terminal on the transmitting side is a wireless base station and the wireless terminal receiving the data frame is a non-base-station wireless terminal, the identifier of the wireless communication group is written in the Address 2 field. Further, when the non-base-station wireless terminal transmits the data frame to the base station terminal, the identifier of the wireless communication group is written in the Address 1 field. When the data frame is transmitted and received between the non-base-station wireless terminals (including the case where the BSS has no wireless base station as shown in FIG. 1, and the case where the wireless terminal 201 communicates with the wireless terminal 202 when the wireless terminal 202 is arranged in addition to the wireless terminal 201 in the configuration of FIG. 2), the identifier of the wireless communication group is written in the Address 3 field. Further, when transmitting the management frame, the identifier of the wireless communication group is written in the Address 3 field. In the case of the IEEE 802.11 wireless LAN shown in FIG. 1, the identifier of the communication group is determined using a random number by the wireless terminal starting the communication group.

When the data frame is transmitted and received between the wireless terminals each serving as a wireless base station, there is no need to specify the identifier of the wireless communication group, which is because the frame is exchanged through the DS level, namely through the connection between a wireless communication group and a wireless communication group (because the transmission destination address is the same as the identifier of one wireless communication group, and the direct transmission source address of the frame is the same as the identifier of the other wireless communication group.)

<Filtering Example Using Identifier of Communication Group>

When a received frame is passed from the PHY layer, wireless terminal examines whether a normal frame is received by checking the CRC. With respect to the frame judged to be normal, a predetermined address field may be referred to depending on the frame type in order to further judge whether the identifier of the wireless communication group is the same as the identifier of the wireless communication group of the wireless terminal concerned.

<Selective Repeat System (Block Ack Mechanism)>

According to a mechanism in the IEEE 802.11 wireless LAN, a delivery confirmation response is transmitted concerning a plurality of data frames, and the wireless terminal on the transmitting side which receives the delivery confirmation response retransmits unsuccessfully transmitted data frames. This is called a block ack (BA) mechanism. The BA mechanism can be applied to the QoS data frame, by which the TID (traffic type) is identified. In a service primitive called MA-UNITDATA.request used when the MAC layer receives data from the upper layer, a priority parameter is included as a variable in addition to data, and this value is used as the TID in the MAC layer. The TID is expressed by an integer of 0 to 15, and access priority etc. are set based on the TID (with respect to the QoS data frame generated in the MAC layer, the TID is properly assigned depending on its intended use.)

When the BA mechanism is introduced, the wireless terminal on the receiving side does not necessarily receive the data frames in the order of their sequence numbers, and thus the wireless terminal on the receiving side requires a mechanism to rearrange the data frames in the order of their sequence numbers to pass the data from the MAC layer to the upper layer in the same order as passed from the upper layer at the wireless terminal on the transmitting side.

In IEEE 802.11n, the unit for performing this rearrangement process is called a receive reordering buffer controller in comparison with a scoreboard context controller which will be explained later. The receive reordering buffer controller is called a reordering buffer for short. The reordering buffer is arranged with respect to each different TID. This is because the frames having different TIDs are assigned with different sequence numbers.

Further, in order to transmit a delivery confirmation response concerning a plurality of data frames, the reception status of each data frame must be retained. In the IEEE 802.11n wireless LAN, the unit for retaining the reception status for the delivery confirmation response is called the scoreboard context controller mentioned above. The scoreboard context controller is called a scoreboard for short. Further, the scoreboard is also called a reception status storage. The scoreboard is also arranged with respect to each different TID, which is because the frames having different TIDs are assigned with different sequence numbers.

Figure 5:
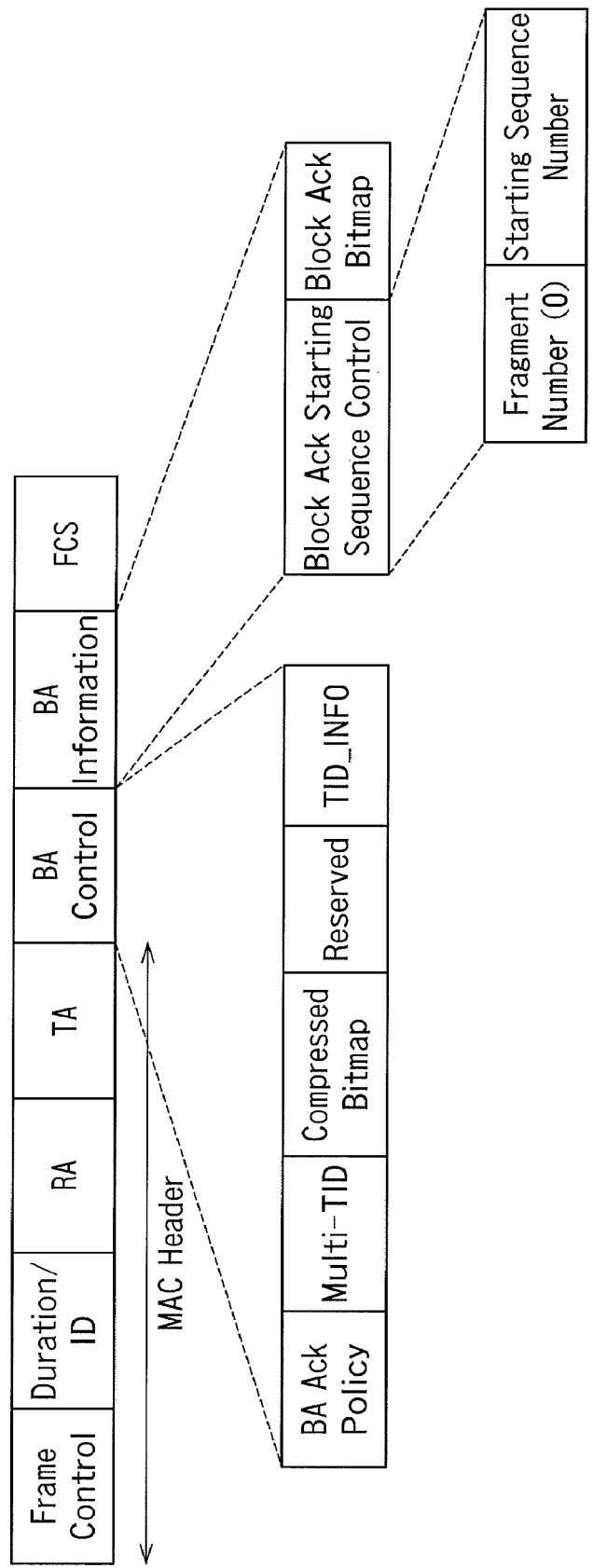
FIG. 5 is a diagram showing a format example of a BA (Block Ack) frame.

The reception status is notified to the wireless terminal on the data transmitting side using the BA (Block Ack) frame as shown in FIG. 5. The wireless terminal on the transmitting side requests the BA frame from the wireless terminal on the receiving side by transmitting a block ack request (BAR) serving as a control frame or by transmitting data with the request incorporated therein.

The former is called an explicit block ack request, which requests the delivery confirmation response by showing the following in a BAR frame, for example: the address information of the wireless terminal serving as a request destination and the wireless terminal serving as a request source; the information of the TID corresponding to the request; and the information of the sequence number from which the request of the delivery confirmation response should started (Starting Sequence Number: SSN.)

The latter is called an implicit block ack request, which requests the delivery confirmation response from the wireless terminal on the receiving side by a combination of a field specifying the type of the delivery confirmation response for the data to be transmitted and the form of the frame to be transmitted. Concretely, in the transmission method using an aggregation technique which aggregates a plurality of MPDUs into a PHY packet as one MPDU (the form of aggregating plural MPDUs is called an aggregate MPDU (A-MPDU)), by indicating the Normal Ack policy requesting a sequential response in the field specifying the type of the delivery confirmation response, the wireless terminal on the receiving side uses the BA frame to notify, to the wireless terminal on the transmitting side, the reception status information corresponding to the TID of the data having the Normal Ack policy. The TID of each data frame is shown in the QoS control (QoS Control) field in FIG. 4.

In both of the former and latter cases, the BA frame includes SSN (Starting Sequence Number) showing the sequence number from which the notification of the reception status is started, as shown in FIG. 5. Concretely, the reception status is shown by a Block Ack Bitmap in which one bit is assigned to each MSDU in the order of the sequence number starting from the SSN (compressed format), or to each MPDU in the order of the fragmentation number in the part having the sequence number corresponding thereto (basic format).

The wireless terminal on the receiving side of the data frame sets 1 in the corresponding part of the Block Ack Bitmap in the case of a received frame, and sets 0 in the corresponding part of the Block Ack Bitmap in the case of an unreceived frame or a frame without reception status (when returning the bitmap including the part corresponding to an unused fragment number or an region other than the scoreboard, for example.) The Block Ack Bitmap used in the following examples is mainly based on the above former case, in which the delivery confirmation response is notified with respect to each MSDU (compressed format) (in this case, fragmentation is not performed also on the data transmitting side.) Even when the information of the fragmentation number is provided (basic format), the fundamental operation is the same.

<Variation of Selective Repeat System in Multichannel/Multimode>

When using the selective repeat system between multichannel/multimode wireless terminals, the operation is based on the settings as to whether the wireless terminals using different channels/modes should employ the following:

the same sequence number or different sequence numbers;
a common reordering buffer or different reordering buffers;

a common wireless terminal address or different wireless terminal addresses; and a common traffic type (TID) or different traffic types (TID.)

Hereinafter, each embodiment of the present invention will be explained in view of the above variations.

(First Embodiment)

In the example to be explained in a first embodiment, different sequence numbers are assigned in different channels/modes, and a reordering buffer is shared in both of the channels/modes. The address of an wireless terminal in each channel/mode is the same, and the TID assigned in each channel/mode is also the same.

Figure 6:
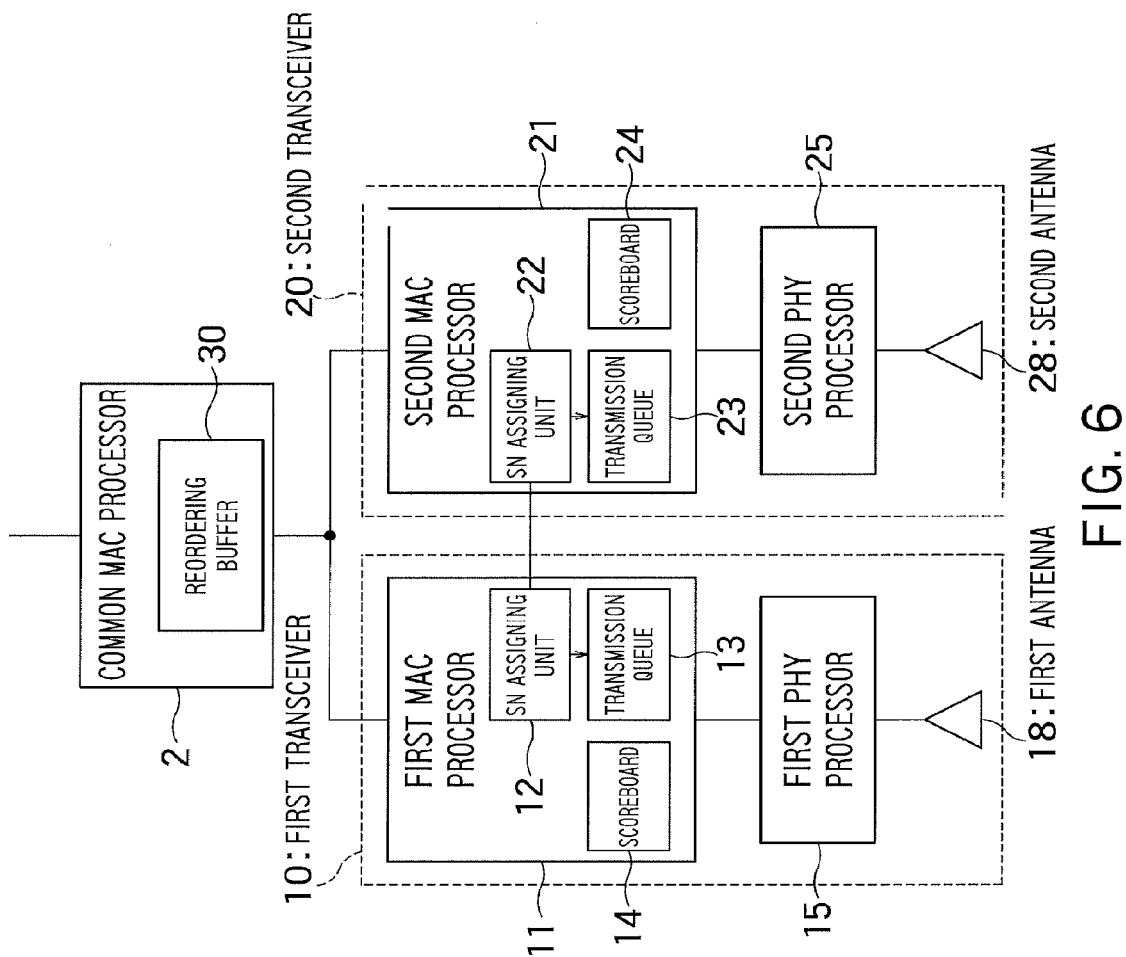
FIG. 6 is a diagram showing a structural example of a wireless terminal according to a first embodiment.

The structure of the wireless terminal according to the first embodiment is as shown in FIG. 6, which is derived from FIG. 3.

A reordering buffer 30 is arranged in the common MAC processor 2, and sequence number (SN) assigning units 12 and 22 are arranged in the first MAC processor 11 and the second MAC processor 21 respectively. Transmission frames are inputted into transmission queues 13 and 23 through the sequence number assigning units 12 and 22 respectively. Further, the first MAC processor 11 and the second MAC processor 21 include scoreboards 14 and 24 respectively to retain the reception status when the wireless terminal operates as the receiving side.

How the reordering buffer 30, sequence number assigning units 12 and 22, transmission queues 13 and 23, and scoreboards 14 and 24 relate to other operation processing units is not shown in detail, but the following operation is performed when transmitting an MSDU. That is, the MSDU allocated by the common MAC processor 2 to the first MAC processor 11 or the second MAC processor 21 is formed into an MPDU and inputted into the transmission queue 13 or the transmission queue 23 through the SN assigning unit 12 or the SN assigning unit 22. When the first MAC processor 11 or the second MAC processor 21 accesses to a desired channel and acquires a transmission right, the MPDU in the transmission queue 13 or the transmission queue 23 is passed to the first PHY processor 15 or the second PHY processor 25, and transmitted from the first antenna 18 or the second antenna 28.

When receiving a frame, the frame is inputted from the first antenna 18 or the second antenna 28 into the first MAC processor 11 or the second MAC processor 21 as an MPDU, through the first PHY processor 15 or the second PHY processor 25. When the frame is a data frame and requires a delivery confirmation response based on the Block Ack mechanism, the information that the frame is received is recorded in its corresponding part in the scoreboard 14 or the scoreboard 24 corresponding to the sequence number of the correctly received frame (or the fragment number of the part corresponding to the sequence number, depending on the cases.) (Concretely, the scoreboard generally has a bit map configuration similar to the Block Ack bitmap, and sets 1 in the bit part corresponding to the sequence number concerned (or the fragment number in the part corresponding to the sequence number concerned, depending on the cases.) Hereinafter, explanation will be given based on this configuration.)

An operation example of the transmitting/receiving process between the wireless terminal on the transmitting side and the wireless terminal on the receiving side will be explained using FIG. 7. In this case, the settings required to use the Block Ack mechanism are previously set to exchange frames between the wireless terminal on the transmitting side and the wireless terminal on the receiving side. In the IEEE 802.11 wireless LAN, the settings are achieved by exchanging an ADDBA Request frame and an ADDBA Response frame.

Figure 7:
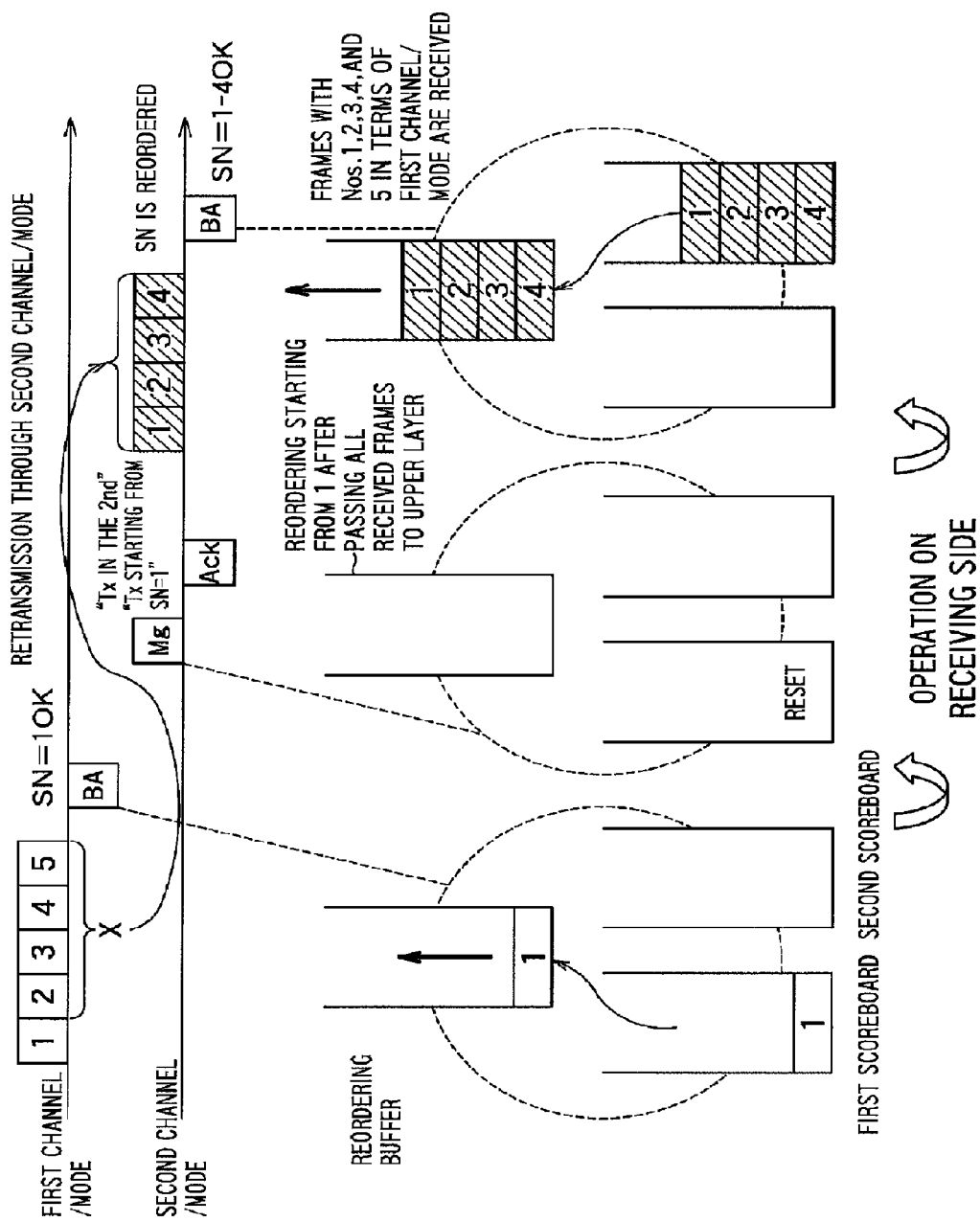
FIG. 7 is a diagram explaining an operation example of the first embodiment.

In FIG. 7, first, the wireless terminal on the transmitting side transmits frames having sequence numbers 1 to 5 forming an A-MPDU through a channel corresponding to the first transceiver 10 (here, the channel is called a first channel. Naturally, the term "channel" may be replaced by "mode, which leads to a first mode). In this example, the A-MPDU includes an implicit block ack request.

When the first transceiver 10 of the wireless terminal on the receiving side receives the A-MPDU, the sequence numbers of the correctly received frames are recorded in the scoreboard (first scoreboard) 14 in the first MAC processor 11. In the example of FIG. 7, the frame having sequence number 1 in the A-MPDU is correctly received, but the other frames are not correctly received and their sequence numbers cannot be grasped. Accordingly, in the scoreboard 14, 1 is set only in the bit part corresponding to sequence number 1, and the other bit parts are kept 0.

Then, the received frame is passed to the reordering buffer 30 shared between the channels/modes. If the starting sequence number (SSN) is set to 1 when setting the Block Ack mechanism, the reordering buffer 30 sets the minimum expected frame sequence number to 1. Accordingly, when the frame having sequence number 1 is inputted into the reordering buffer 30, this sequence number 1 corresponds to the minimum expected frame sequence number, and thus this frame is passed from the MAC layer to the upper layer (LLC layer). Then, the minimum expected frame sequence number is changed from 1 to 2 (incremented by 1).

When the frame having the minimum expected sequence number is not received and frames having other sequence numbers are received, the following operation is performed. That is, the reordering buffer 30 stores frames in the order of the sequence number, and when the reordering buffer 30 is full, the minimum expected frame sequence number is cancelled and incremented by 1. When the frames having the sequence numbers equal to or larger than the incremented sequence number are gathered, the frames are passed from the MAC layer to the upper layer by a process as stated above. At that time, the minimum expected frame sequence number is also updated.

When the first MAC processor 11 is notified by a signal (a primitive called PHY-RXEND.indication in the IEEE 802.11 wireless LAN) from the first PHY processor 15 that the A-MPDU is completely received, the first MAC processor 11 generates a Block Ack (BA) frame from the implicit block ack request indicated in the A-MPDU, reflects the information of the scoreboard 14 in the Block Ack Bitmap of the BA frame, and transmits the BA frame after a fixed period of time from the end of the A-MPDU reception (after a fixed period of time called SIFS in the IEEE 802.11 wireless LAN). In FIG. 7, the BA frame notifies that the frame having sequence number 1 is correctly received.

Suppose a case where the wireless terminal on the transmitting side judges, from the information of the received BA frame, that many frames are unsuccessfully transmitted in the communication using the first channel/mode, and determines to use the channel/mode corresponding to the second transceiver 20 (here, the channel/mode is called a second channel/mode) when transmitting data thereafter. For example, the first transceiver 10 of the wireless terminal on the transmitting side manages the delivery situation of the transmission frame based on a delivery confirmation response frame from the wireless terminal on the receiving side, and determines to change the transmission source to the second transceiver 20 since a specific level of communication quality is not satisfied in the first channel/mode. Note that a judgment can be also made as to the change from the second transceiver 20 to the first transceiver 10, when the second transceiver 20 has the same function.

The wireless terminal on the transmitting side which made the above determination moves the frames having sequence numbers 2 to 5 from the first MAC processor 11 to the second MAC processor 21. More concretely, the frames having sequence numbers 2 to 5 in the transmission queue 13 of the first MAC processor 11 are assigned with new sequence numbers for the second channel/mode by the sequence number assigning unit 22 of the second MAC processor 21 and inputted into the transmission queue 23. At this time, the second MAC processor 21 retains the sequence number newly assigned by the second MAC processor 21 to the frame having the smallest sequence number in the frames to be moved from the first MAC processor 11, which is namely the frame having sequence number 2 in FIG. 7. In the example of FIG. 7, the sequence number newly assigned by the second MAC processor 21 is 1.

Next, the wireless terminal on the transmitting side notifies the wireless terminal on the receiving side that the current channel/mode will be changed. In this example, the notification is given using a management frame different from a series of data frames to be exchanged (expressed as "Mg" in FIG. 7). This is because the object of the notification is not to transmit data but to control the operation of the wireless terminal. Further, in the IEEE 802.11 wireless LAN, a data frame passed from the upper layer (LLC layer) of the MAC layer is assigned with a unique TID (traffic type) by the upper layer, where a TID determines transmission priority, while the management frame is always given with the highest priority. This makes it easier to transmit the notification frame to the wireless terminal on the receiving side before transmitting data frames after changing the channel/mode.

Further, in this case, the notification frame is transmitted through the channel/mode after change, which is namely the second channel/mode. This is because it is expected that the management frame can be successfully transmitted by using the second channel/mode having higher reliability, since many frames are lost through the first channel/mode.

The notification frame includes the information showing that data are transmitted through the second channel/mode (expressed as "Tx in the 2nd" in FIG. 7) and that the starting sequence number (SSN) for the transmission through the channel/mode after change is 1 (expressed as "Tx starting from SN=1" in FIG. 7). Here, the starting sequence number (SSN) for the transmission through the channel/mode after change is the sequence number (here, 1) newly assigned by the second MAC processor 21 to the frame having the minimum sequence number in the frames moved from the first MAC processor 11. Although omitted in FIG. 7, when the above notification information is not enough for the wireless terminal on the receiving side to grasp the TID of the data frame for which the channel/mode should be changed, corresponding TID information is written in the notification frame. When only one TID is set for the Block Ack mechanism between the wireless terminals, the wireless terminal on the receiving side can grasp the target TID and thus the corresponding TID information can be omitted. Further, this can be applied also when changing the type (Subtype) of the management frame itself used for notification corresponding to the TID of the target data frame.

Generally, in the IEEE 802.11 wireless LAN, when a frame transmitted to a single wireless terminal (unicast frame) is received by the wireless terminal, the wireless terminal transmits an ACK frame after a period of SIFS, which is expressed as "Ack" in FIG. 7 since the BA mechanism is not used in the case of a management frame.

The wireless terminal on the receiving side, when receiving the notification frame concerning the change of the channel/mode, performs a process for passing all received frames in the reordering buffer 30 of the common MAC processor 2 from the MAC layer to the upper layer (LLC layer), and sets the minimum expected frame sequence number to the transmission starting sequence number notified by the frame.

In this case, it is desirable for the wireless terminal on the receiving side to identify the transceiver corresponding to the channel/mode used to exchange the frame having the TID concerned (the first transceiver 10 in this case) between the wireless terminal on the receiving side and the wireless terminal on the transmitting side, and to reset the scoreboard 14 in the MAC processor of the corresponding transceiver (the first MAC processor 11 in this case.) By resetting the scoreboard 14, the scoreboard 14 can be utilized for receiving frames from another wireless terminal or frames having another TID.

Note that resetting the scoreboard is effective also when employing a method called partial state BA in IEEE 802.11n. That is, when the partial state BA in IEEE 802.11n is employed, the scoreboard is not required to be intentionally reset for this purpose since the scoreboard currently retaining the status can be reset and used if there is no available empty scoreboard for a new frame received from the wireless terminal, for example. However, when a plurality of scoreboards are arranged in the partial state BA, by previously resetting the scoreboard 14 judged not to be used anymore as described above, the selection algorithm for selecting the scoreboard to be reset can be simplified by determining that the currently unused scoreboard should be preferentially selected.

The transceiver corresponding to the channel/mode been used to exchange frames having the corresponding TID with the wireless terminal on the transmitting side can be identified by the following methods. In a first method, the corresponding TID is identified from the notification frame, and the common MAC processor 2, for example, identifies the transceiver having processed the corresponding TID until the notification frame is received. In a second method, when the notification frame includes the information to which channel/mode (the second channel/mode in this example) the transmission will be switched and when the wireless terminal corresponds to only two channels/modes, the channel/mode not shown as the switched one is exclusively judged to be the channel/mode been used to exchange frames having the corresponding TID with the wireless terminal on the transmitting side, and the transceiver corresponding to the judged channel/mode can be identified.

The wireless terminal on the transmitting side transmits the notification frame, and when receiving a response frame to the notification frame, transmits frames from the second transceiver 20 corresponding to the second channel/mode. These frames are retransmitted frames whose sequence numbers were 2 to 5 when transmitted through the first channel/mode and are renumbered from 1 to 4 by the second MAC processor 21.

In FIG. 7, the response frame to the notification frame is an ACK frame. However, in addition to the ACK frame, the wireless terminal on the receiving side may transmit a response frame (a management frame when the notification frame is a management frame) to the notification frame at the point of completing the process of the reordering buffer 30, so that the wireless terminal on the transmitting side can transmit frames through the newly changed channel/mode after receiving the response frame.

When receiving the frame through the second channel/mode, the wireless terminal on the receiving side passes the received frame to the reordering buffer 30 of the common MAC processor 2 while recording the reception status by the scoreboard 24 of the second MAC processor 21. In FIG. 7, all of the frames having new sequence numbers 1 to 4 and transmitted through the second channel/mode are correctly received. Thus, the normal reception of the frames having sequence numbers 1 to 4 is recorded in the scoreboard 24, and the frames having sequence numbers 1 to 4 are sequentially passed from the reordering buffer 30 to the upper layer of the MAC layer. As a result, the frames having sequence numbers 1, 2, 3, 4, and 5 in terms of the first channel/mode are sequentially received.

FIG. 7 shows an example in which the frames having sequence numbers 2 to 5 in the first MAC processor 11 are moved to the second MAC processor 21 and transmitted. The subsequent frames having the same TID and passed from the upper layer of the MAC layer are passed from the common MAC processor 2 to the second MAC processor 21 and assigned with successive sequence numbers (starting from 5 in this example).

Further, FIG. 7 shows an example when the first MAC processor 11 has frames to be moved to the second MAC processor 21. The following operation is performed when frames having a certain TID were previously transmitted from the first MAC processor 11 and the first MAC processor 11 does not currently have frames to be moved to the second MAC processor 21 but intends to transmit the subsequent frames having the same TID from the second MAC processor 21.

That is, when the common MAC processor 2 allocates a data frame passed from the upper layer of the MAC layer, the data frame having the corresponding TID is passed to the second MAC processor 21. Then, before the data frame having the corresponding TID is transmitted through the second channel/mode, the minimum sequence number assigned by the sequence number assigning unit 22 of the second MAC processor 20 is notified by the notification frame. The other operations are as stated above.

FIG. 7 shows an example when the latter transmission frames in the first A-MPDU are not successively received by the wireless terminal on the receiving side, but other reception situation can be assumed. Accordingly, next, an example as shown in FIG. 8 will be considered.

Figure 8:
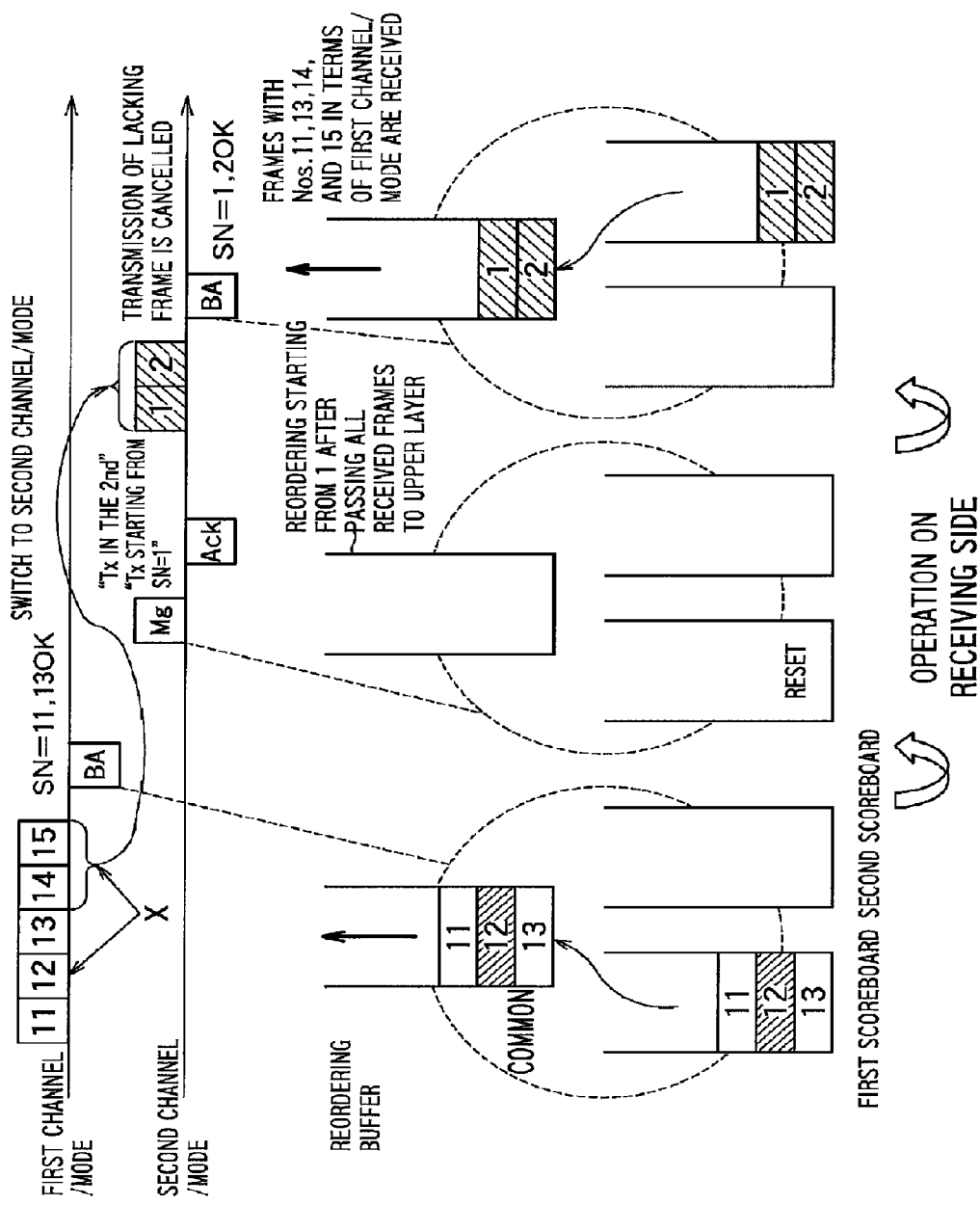
FIG. 8 is a diagram explaining another operation example of the first embodiment.

In the situation shown in FIG. 8, the wireless terminal on the transmitting side transmits frames having sequence numbers 11 to 15. The wireless terminal on the receiving side correctly receives the frames having sequence numbers 11 and 13, and the reception situation is recorded in the first scoreboard 14. That is, 1 is set in the part corresponding to the correctly received frame having sequence number 11, 0 is set in the part corresponding to the unreceived frame having sequence number 12 which is between sequence numbers 11 and 13, and 1 is set in the part corresponding to the correctly received frame having sequence number 13. Then, after the A-MPDU is received, a BA frame is transmitted, based on the implicit block ack request, to notify that the frames having sequence numbers 11 and 13 are received. The received frames having sequence numbers 11 and 13 are passed to the reordering buffer 30 in the common MAC processor 2. When the minimum expected frame sequence number of the reordering buffer 30 is 11, the frame having sequence number 11 is passed from the MAC layer to the upper layer. Since the frame having sequence number 12 is unreceived, the reordering buffer 30 changes the minimum expected frame sequence number to 12, and retains the frame having sequence number 13.

The wireless terminal on the transmitting side stops the transmission through the first channel/mode, and determines to perform transmission through the second channel/mode and transmits a frame for notifying the wireless terminal on the receiving side of the switch, as in the example of FIG. 7.

When receiving the notification frame, the wireless terminal on the receiving side performs the process as stated above. Particularly in this example, since the reordering buffer 30 retains the frame having sequence number 13 while waiting to receive the frame having sequence number 12, the frame having sequence number 13 is passed from the MAC layer to the upper layer.

The wireless terminal on the transmitting side grasps that the frames having sequence numbers 12, 14, and 15 transmitted through the first channel/mode are not received by the wireless terminal on the receiving side. The frames having sequence numbers 14 and 15 are required to be retransmitted through the second (switched) channel/mode, and the frame having sequence number 12 lacking between the frames having sequence numbers 11 and 13, which are correctly received in the reception status shown by the BA frame, is not retransmitted through the second channel/mode. The frames whose sequence numbers were 14 and 15 and which were transmitted through the first channel/mode are assigned with sequence numbers 1 and 2 and transmitted through the second channel/mode.

The wireless terminal on the receiving side correctly receives the frames newly assigned with sequence numbers 1 and 2, and passes them to the upper layer through the reordering buffer 30. As a result, the frames having sequence numbers 11, 13, 14, and 15 in terms of the sequence numbers assigned at the first channel/mode are received.

In the example of FIG. 8, the BA frame is transmitted concerning the reception status of the frames having the sequence numbers starting from 11, but when the reception status concerns only the frames having the sequence numbers starting from 13 for example, it is possible to judge that the frames having sequence numbers 11 and 12 are both not received by the wireless terminal on the receiving side. In this case, the frames having sequence numbers 11 and 12 are regarded as lacking frames.

These lacking frames cannot be received by the wireless terminal on the receiving side after the above process for changing the channel/mode, which can be prevented by retransmitting the lacking frames through the same channel/mode (the first channel/mode in this case) before performing the process for changing the channel/mode.

Next, another different example of reception situation will be explained using FIG. 9. In the example shown in FIG. 9, the wireless terminal on the transmitting side cannot clearly judge whether the frames are received by the wireless terminal on the receiving side.

The wireless terminal on the transmitting side transmits the frames having sequence numbers 11 and 12 through the first channel/mode based on A-MPDU, and the wireless terminal on the receiving side correspondingly transmits a response using a BA frame showing that the frame having sequence number 11 is correctly received. The wireless terminal on the receiving side performs a process for passing the data of the frame having sequence number 11 from the reordering buffer 30 to the upper layer of the MAC layer. In this situation, the wireless terminal on the transmitting side grasps that the frame having sequence number 12 is not received by the wireless terminal on the receiving side, and thus there is no perception gap in terms of the situation therebetween.

Next, assume that the wireless terminal on the transmitting side retransmits the frame having sequence number 12 through the first channel/mode while requesting an ACK frame as an instant response (in this case, 1 is set in the retry bit mentioned later.) The wireless terminal on the receiving side receives the frame having sequence number 12, transmits an ACK frame, and passes the frame having sequence number 12 to the reordering buffer 30. The reordering buffer 30 performs a process for passing the frame having sequence number 12 to the upper layer of the MAC layer, since the sequence number 12 is passed to the reordering buffer 30 after the sequence number 11 in sequence.

Here, assume that the ACK frame from the wireless terminal on the receiving side cannot be correctly received by the wireless terminal on the transmitting side due to errors. In this case, the wireless terminal on the transmitting side cannot confirm whether the frame having sequence number 12 is received by the wireless terminal on the receiving side. In this situation, there is a perception gap in terms of the situation between the wireless terminal on the transmitting side and the wireless terminal on the receiving side. If the wireless terminal on the transmitting side changes the channel/mode in this situation, the wireless terminal on the transmitting side cannot transmit the frame whose sequence number is 12 and whose reception by the wireless terminal on the receiving side is not confirmed through the channel/mode after change. This is because the wireless terminal on the receiving side cannot recognize duplicate data, namely cannot recognize whether the frame having a different sequence number transmitted through the channel/mode after change is the same as the previously received frame whose sequence number was 12. Accordingly, as shown in FIG. 9, the frames having the sequence numbers starting from 13, which are not transmitted through the first channel/mode yet, are assigned with new sequence numbers starting from 1 and transmitted through the second channel/mode. When these frames are correctly received by the wireless terminal on the receiving side, as a result, all of the frames having sequence numbers 11, 12, 13, 14, and 15 in terms of the first channel/mode are received by the wireless terminal on the receiving side.

Here, the wireless terminal on the receiving side transmits the ACK frame concerning the frame having sequence number 12 received through the first channel/mode. Since the frame having sequence number 12 is a frame having the TID set for the Block Ack mechanism, the reception status as shown in FIG. 9 is recorded also in the scoreboard 14. Accordingly, if the wireless terminal on the transmitting side requests transmission of the reception status concerning the frames having the sequence numbers starting from 11 or 12 by a BA frame, the BA frame can notify that the frame having sequence number 12 is received. Therefore, the reception status of the frame whose sequence number is 12 and whose reception is not confirmed before changing the channel/mode can be confirmed by retransmitting the frame through the same channel/mode, or by requesting a BA frame showing the reception status concerning the frames having the sequence numbers including 12 as stated above.

Figure 9:
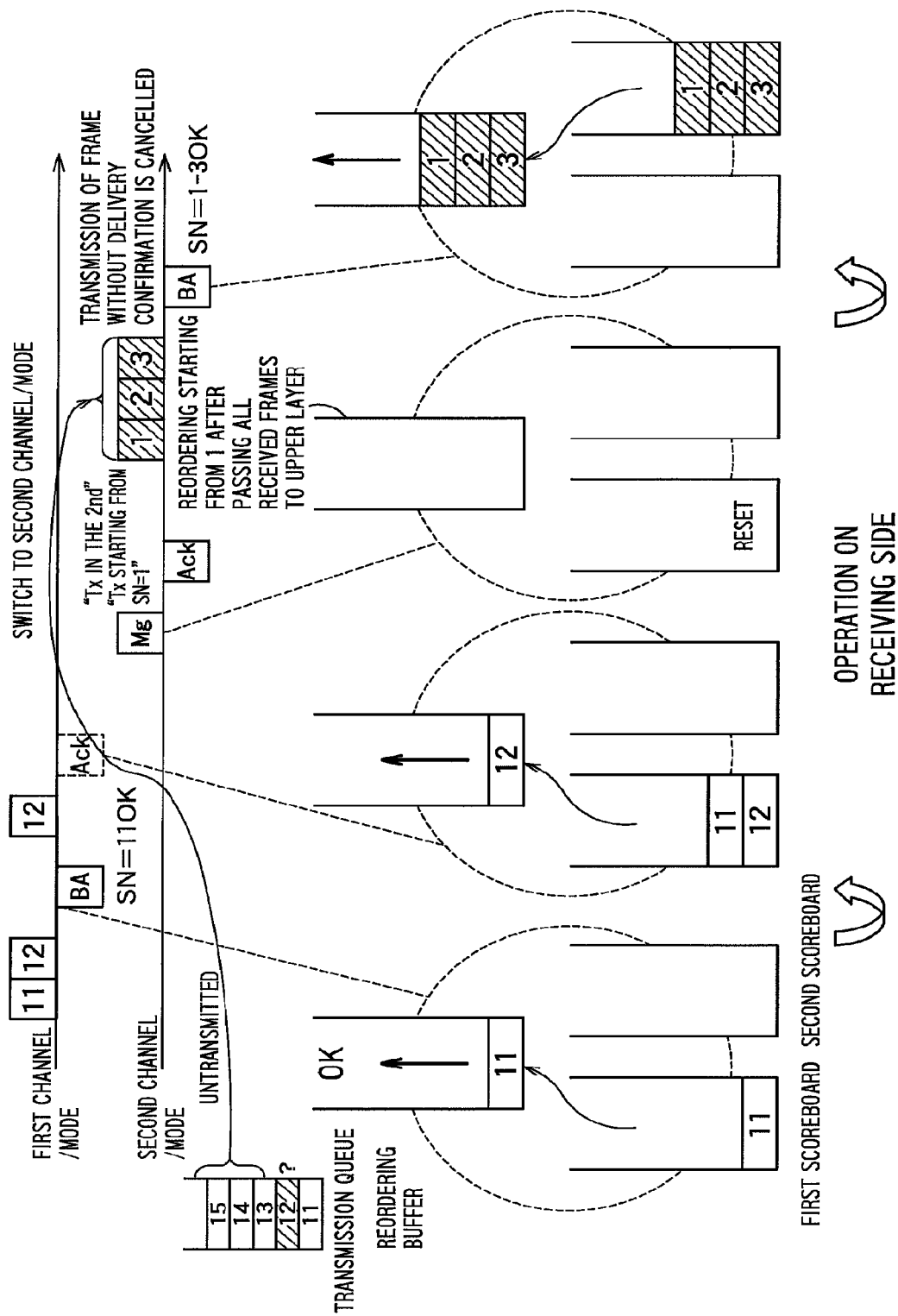
FIG. 9 is a diagram explaining further another operation example of the first embodiment.

In the example of FIG. 9, the transmitted frame having sequence number 12 took the style to request an ACK frame, but when this single frame having sequence number 12 is transmitted as an A-MPDU (in this case, a PHY packet including substantially one MPDU is transmitted though the PHY packet generally includes a plurality of MPDUs) including an implicit block ack request, the ACK frame is changed to the BA frame. As in the case of the ACK frame, if the BA frame itself cannot be successfully received, it is impossible to confirm the reception status.

<Restrictions Imposed on Transmitting Side>

As can be understood from the examples shown in FIG. 8 and FIG. 9, the frames which can be retransmitted by the wireless terminal on the transmitting side through the channel/mode after change are the frames which are previously transmitted having the successive sequence numbers smaller than and continuing to the minimum untransmitted sequence number, and which are confirmed as not being received by the wireless terminal serving as a data transmission destination (frames notified as unreceived in the reception status shown by the wireless terminal on the data receiving side). With respect to untransmitted frames, there is no restriction as to the change in the transmission channel/mode, even when they are already stored in the transmission queue of the MAC processor before the channel/mode change.

Generally, in the IEEE 802.11 wireless LAN, when retransmitting a frame, a retry bit is set in the frame control field of the MAC header. When receiving a frame having a retry bit, it is possible to confirm whether a duplicate frame having the same information has been previously received. In the present embodiment, the lacking frame as shown in FIG. 8 or the frame without delivery confirmation as shown in FIG. 9 is restrained from being retransmitted through another channel/mode, and thus there is no need to perform a process for retransmitting such a frame by setting a retry bit by the MAC processor corresponding to the changed channel/mode. That is, in the operation of the present embodiment, duplicate reception through different channels/modes is previously prevented on the data transmitting side, and thus it is not necessary to perform a transmission process requiring setting a retry bit in the channel/mode after change. Naturally, when retransmitting a frame through the same channel/mode before change, the retry bit is set.

(Effect of First Embodiment)

<1>

When changing the transmission of frames between the first transceiver and the second transceiver, the wireless terminal on the receiving side is notified of the information concerning the channel corresponding to the transceiver after change and the transmission starting sequence number of frames to be transmitted by the transceiver after change, by which the wireless terminal on the receiving side can obtain the information required to rearrange the frame order, and transmission frames can be flexibly moved between the first transceiver and the second transceiver. Therefore, flexible actions can be taken when the communication link in one channel is suddenly broken.

<2>

By limiting the frame which can be retransmitted by the transceiver after change, the operation of the wireless terminal on the transmitting side makes it possible to previously prevent the wireless terminal on the receiving side from duplicate reception through different channels/modes.

In this way, the wireless terminal on the receiving side is not required to manage duplicate frames having the same data and having different sequence numbers depending on the first transceiver and the second transceiver.

<3>

By indicating, in the change notification frame, the information concerning the channel corresponding to the frame transceiver after change, the wireless terminal on the receiving side can clearly recognize the subsequent channel for reception and can identify the transceiver corresponding to the specified channel. Further, the wireless terminal on the receiving side can make preparations for receiving frames. That is, the wireless terminal on the receiving side can receive frames transmitted through different channels/modes in the correct order. This means that the reordering process can be performed in the MAC layer even when the transmission order is changed in the MAC layer, without depending on the sequence in the upper layer.

<4>

In the wireless terminal on the transmitting side, it is possible to reduce loads of preparing frames in the stage immediately before an access controller (the part in the first/second MAC processor closer to the first/second PHY processor), by which transmission frames can be flexibly moved through different modes, and the wireless terminal on the receiving side can prevent complexity of the process when rearranging the frames received through different frequency band/channel in order of transmission. Therefore, flexible actions can be taken when the communication link in one frequency band/channel is suddenly broken. Further, the wireless terminal on the receiving side can use the memory more efficiently by releasing the buffer corresponding to the frequency band/channel not to be used based on the notification from the wireless terminal on the transmitting side.

<5>

By extracting, from the change notification frame, the information concerning the channel corresponding to the frame transceiver after change in order to exclusively identify the channel before change, the wireless terminal on the transmitting side can omit to notify the information of the channel before change. Accordingly, the length of the change notification frame can be shortened, and the usage rate of the wireless medium can be reduced for high efficiency.

(Second Embodiment)

Since a second embodiment is based on the first embodiment, hereinafter, a difference from the first embodiment will be mainly explained.

The second embodiment is different from the first embodiment in transmitting the change notification frame through the channel/mode after change, instead of transmitting a channel/mode change notification frame including the information concerning the channel/mode after change.

For example, the channel/mode change notification frame expressed as "Mg" in FIG. 7 used in the first embodiment is transmitted in the channel/mode after change. Based on this configuration, the change notification frame is not required to include the information concerning the channel/mode after change. As described also in the first embodiment, if assumed that the channel/mode is changed when the currently used channel/mode is in an inappropriate communication situation causing many dropped frames etc., the channel/mode after change is expected to establish a more suitable communication link with the wireless terminal on the receiving side than the channel/mode before change. Therefore, by transmitting the change notification frame through the channel/mode after change, the change notification frame can be expected to be surely received by the wireless terminal on the receiving side.

Further, as described in the first embodiment, after transmitting a channel/mode change notification frame to the wireless terminal on the receiving side and receiving a response frame corresponding thereto, data frames are transmitted through the channel/mode after change, which makes it possible to change the channel/mode while surely grasping that the change notification frame is surely received by the wireless terminal on the receiving side (Note that the response frame may be an ACK frame corresponding to the change notification frame, or a management frame for response may be separately transmitted from the wireless terminal on the receiving side.) When no response frame is received, the wireless terminal on the transmitting side reconsiders whether or not to change the channel/mode, and may stop changing the channel/mode depending on the consideration result and transmit data frames through the same channel/mode (retransmission). Thus, the data frame can be transmitted to the wireless terminal on the receiving side in a more reliable method.

When receiving the change notification frame, the wireless terminal on the receiving side transmits a response frame, and recognizes that the channel/mode corresponding to the transceiver by which the change notification frame is received is used as the channel/mode after change to transmit subsequent corresponding data frames. For example, in the example of FIG. 7, since the change notification frame is received by the second transceiver, it is recognized that the subsequent data frame having the corresponding TID are transmitted through the second channel/mode corresponding to by the second transceiver. Further, as described in the first embodiment, a series of processes for receiving the data frame is performed in the reordering buffer etc.

(Effect of Second Embodiment)

According to the present embodiment, by transmitting the change notification frame through the channel/mode after change, the change notification frame is not required to include the information concerning the channel/mode after change. Accordingly, the length of the change notification frame can be further shortened, and the usage rate of the wireless medium can be reduced for high efficiency. Further, if assumed that the channel/mode is changed when the currently used channel/mode is in an inappropriate communication situation, the channel/mode after change is expected to establish a more suitable communication link with the wireless terminal on the receiving side than the channel/mode before change. The change notification frame can be expected to be surely received by the wireless terminal on the data side.

Further, after receiving a response frame to the channel/mode change notification frame, data frames are transmitted through the channel/mode after change, which makes it possible to change the channel/mode while surely grasping that the change notification frame is surely received by the wireless terminal on the receiving side. When no response frame is received, the wireless terminal on the transmitting side reconsiders whether or not to change the channel/mode, and may stop changing the channel/mode depending on the consideration result and transmit data frames through the same channel/mode. Accordingly, the data frame can be transmitted to the wireless terminal on the receiving side in a more reliable method.

(Third Embodiment)

Since a third embodiment is based on the first embodiment, hereinafter, a difference from the first embodiment will be mainly explained.

The third embodiment is different from the first embodiment in that the channel/mode change notification frame includes the information concerning the channel/mode before change, namely the channel/mode corresponding to the transceiver before change in the wireless terminal on the transmitting side.

For example, in the example of FIG. 7 used in the first embodiment, since the first channel/mode is changed to the second channel/mode, the channel/mode change notification frame expressed as "Mg" includes the information that the first channel/mode is the channel/mode before change in the present embodiment.

In this way, the wireless terminal on the receiving side receiving the change notification frame can easily identify the transceiver before change directly corresponding to the information concerning the channel/mode before change specified in the change notification frame. That is, there is no need to grasp the transceiver previously used to exchange (transmit/receive) the data frame having the same TID or to grasp the transceiver exclusive of the transceiver corresponding to the channel/mode after change based on the information concerning the channel/mode after change. Particularly, when arranging three or more transceivers corresponding to different channels/modes, the process for identifying the transceiver before change can be simplified. After identifying the transceiver after change, the process described in the first embodiment can be performed on the transceiver before change.

(Effect of Third Embodiment)

According to the present embodiment, the change notification frame includes the information concerning the channel/mode before change, by which the wireless terminal on the receiving side receiving the change notification frame can easily identify the transceiver before change directly from the information concerning the channel/mode before change specified in the change notification frame. That is, there is no need to grasp the transceiver previously used to exchange (transmit/receive) the data frames having the same TID or to grasp the transceiver exclusive of the transceiver corresponding to the channel/mode after change based on the information concerning the channel/mode after change. Particularly, when arranging three or more transceivers corresponding to different channels/modes, the process for identifying the transceiver before change can be simplified.

(Fourth Embodiment)

Since a fourth embodiment is based on the first embodiment, hereinafter, a difference from the first embodiment will be mainly explained.

In the first embodiment, the information concerning the transmission starting sequence number for the channel/mode after change is described in the change notification frame. The fourth embodiment is different from the first embodiment in providing the operation capable of omitting the transmission starting sequence number.

In terminal structure of FIG. 6 in the first embodiment, when moving frames from the first MAC processor 11 to the second MAC processor 21 and the second MAC processor 21 reorders the sequence numbers (or when moving frames from the second MAC processor 21 to the first MAC processor 11 and the first MAC processor 11 reorders the sequence numbers), the sequence number assigning unit initializes the sequence numbers and uses the sequence numbers starting from 0. Another fixed sequence number may be used instead of 0 as a default value. When it is determined that such a operation is inevitably performed between the transmission/reception terminals, the change notification frame can omit the transmission starting sequence number for the channel/mode after change. In order that the wireless terminals can consistently recognize the default value, the default value may be notified when establishing the settings for the Block Ack mechanism between the wireless terminals. When the length of the setting frame is limited on a byte basis for example, it is considered that there is an unused field (reserved field). If such a field can be utilized, communication efficiency can be improved.

Explanation will be given based on FIG. 7. In the present embodiment, the channel/mode change notification frame expressed as "Mg" does not include the information that transmission through the second channel/mode after change starts from sequence number 1 (shown as "Tx starting from SN=1"). For example, when the wireless terminal on the transmitting side moves frames between the first and second transceivers 10 and 20 and their sequence numbers are reordered to start from 0 on the transceiver after change, frames with sequence numbers 2 to 5 in the first channel/mode correspond to those with sequence numbers 0 to 3 in the second channel/mode after change respectively.

When receiving the change notification frame, the wireless terminal on the receiving side judges that the transmission starting sequence number in the second channel/mode after change is 0, which is the default value in this case, and performs the subsequent process described in the first embodiment.

(Effect of Fourth Embodiment)

According to the present embodiment, the transmission starting sequence number for the transceiver after change is set to a default value, by which the channel/mode change notification frame is not required to include the transmission starting sequence number for the transceiver after change. Accordingly, the length of the change notification frame can be shortened and the usage rate of the wireless medium can be reduced with high efficiency.

Further, since the channel/mode is changed based on the condition that the starting sequence number is reset to a default value, the wireless terminal on the receiving side can perform the receiving process corresponding to the change of transceiver, without requiring the change notification frame to include the transmission starting sequence number for the transceiver after change.

Further, when exchanging a setting frame so that the wireless terminals can consistently recognize the default value, communication efficiency can be improved by writing the information in an unused field of the setting frame, for example.

(Fifth Embodiment)

Since a fifth embodiment is based on the first embodiment, hereinafter, a difference from the first embodiment will be mainly explained.

The fifth embodiment is different from the first embodiment in notifying the difference between the transmission starting sequence number and the sequence number in the channel/mode before change corresponding to the frame whose transmission is started through the channel/mode after change, instead of notifying the transmission starting sequence number for the channel/mode after change while both using the change notification frame.

Hereinafter, explanation of the fifth embodiment will be given using FIG. 10, which is derived from FIG. 8 used in the first embodiment.

Figure 10:
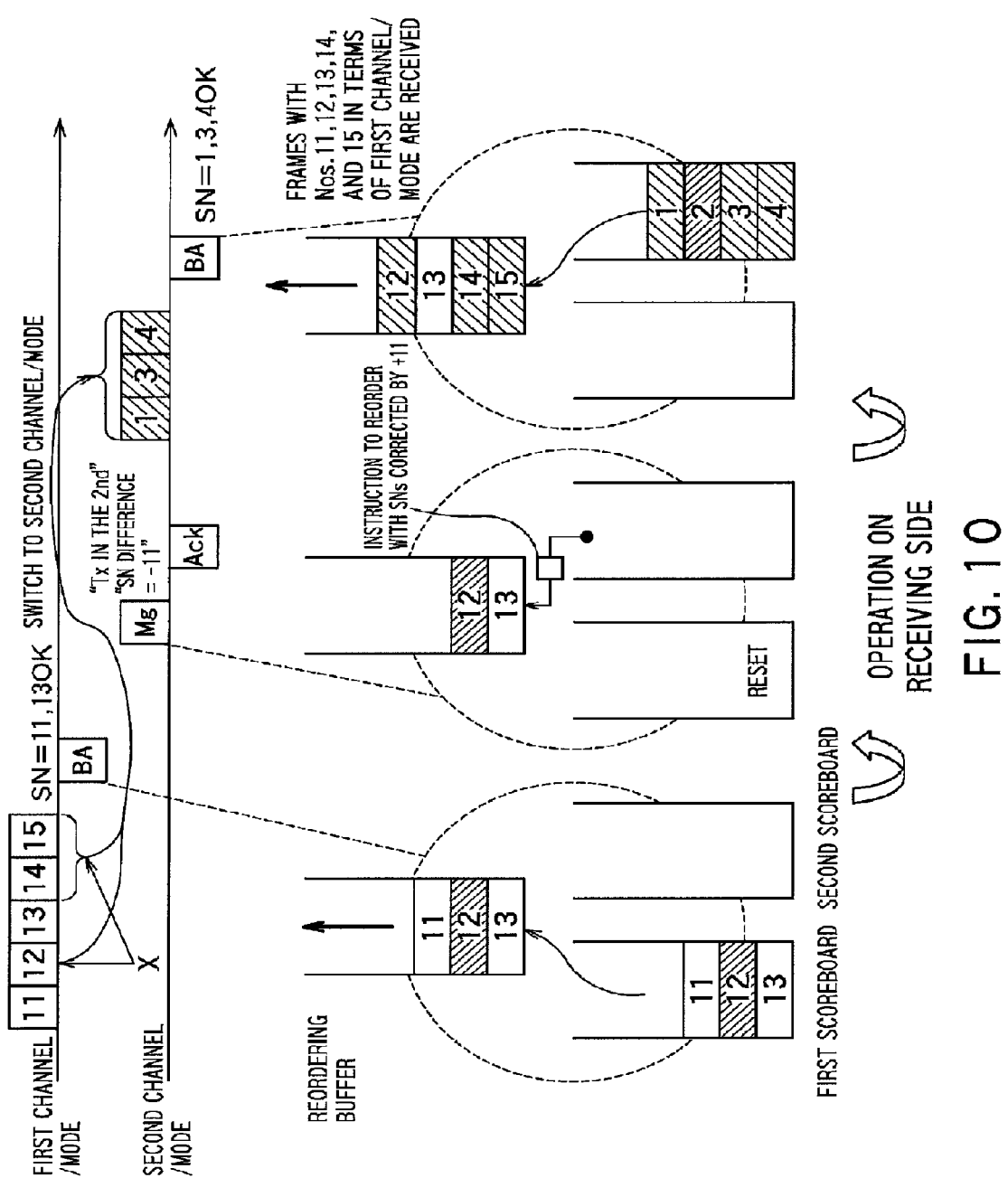
FIG. 10 is a diagram explaining an operation example of a fifth embodiment.

In FIG. 10, the wireless terminal on the transmitting side transmits data frames having sequence numbers 11 to 15 through the first channel/mode, and receives a BA frame showing the reception status that the data frames having sequence numbers 11 and 13 are received by the wireless terminal on the receiving side. The reordering buffer 30 in the wireless terminal on the receiving side passes the frame having sequence number 11, if the minimum expected frame sequence number is 11, from the MAC layer to the upper layer (LLC layer), and sets the minimum expected frame sequence number to 12.

Here, the wireless terminal on the transmitting side determines to switch transmission to the second channel/mode, and sequentially transmits the frames unreceived through the first channel/mode, namely the frames having the sequence numbers starting from 12, through the second channel/mode.

Accordingly, in order to transmit the frames unreceived through the first channel/mode, namely the frames having sequence numbers 12, 14, and 15, through the second channel/mode, the frames are moved from the transmission queue 13 of the first MAC processor 11 to the transmission queue 23 of the second MAC processor 21. The data frame having sequence number 12 in the first MAC processor 11 is changed to have sequence number 1 in the second MAC processor 21, and transmission is started from sequence number 1. Here, the difference between sequence number 12 assigned to the data frame in the first MAC processor 11 and sequence number 1 assigned to that in the second MAC processor 21, which is −11 in this case, is written in the channel/mode change notification frame (expressed as "SN difference=−11" in FIG. 10.)

In the first embodiment, when receiving the change notification frame, the wireless terminal on the receiving side passes all received frames in the reordering buffer 30 to the upper layer, and then sets the minimum expected frame sequence number to the notified transmission starting sequence number. On the other hand, in the present embodiment, when passing reception data frames from the transceiver after change (the second MAC processor 21 in this case) to the upper layer through the reordering buffer 30 in the common MAC processor 2, a correction process is added to correct the sequence numbers of the received data frames based on the above notified differential value (expressed as "instruction to reorder with SNs corrected by +11" in FIG. 10). In order to realize this process, in FIG. 6, a correction process block over passing received frames may be added to the interface between the second MAC processor 21 and the common MAC processor 2, or may be arranged on the side of the second MAC processor 21. Instead, the correction process block maybe arranged on the side of the common MAC processor 2.

Note that in order to cover the case when the transceiver after change is the first transceiver 10, a similar processing unit (correction process block) is required to pass received data frames from the first transceiver 10 to the common MAC processor 2.

After transmitting the channel/mode change notification frame (and receiving a response if required), the wireless terminal on the transmitting side transmits the data frames having sequence numbers 1, 3, and 4 through the second channel/mode. These frames correspond to the data frames whose sequence numbers were 12, 14, and 15 in the first channel/mode. When correctly receiving the frames having sequence numbers 1, 3, and 4 through the second channel/mode, the wireless terminal on the receiving side notifies the wireless terminal on the transmitting side of those correctly received by using a BA frame, and passes the received frames to the reordering buffer 30. At this time, the wireless terminal on the receiving side corrects the sequence numbers of the received frames by the above notified differential value. In this case, the data frames having sequence numbers 1, 3, and 4 are corrected to have sequence numbers 12, 14, and 15 based on the differential value "−11," and passed to the reordering buffer 30. Since the frame having sequence number 12 which could not be received through the first channel/mode is received through the second channel/mode, the frames having sequence numbers 12, 13, 14, and 15 are sequentially passed to the upper layer (note that the frame having sequence number 13 is previously received through the first channel/mode).

In this case, only those data frames notified as unreceived by the wireless terminal on the receiving side through the first channel/mode are retransmitted through the second channel/mode, but the frames notified as previously received may be also retransmitted through the second channel/mode.

For example, the frame having sequence number 13 in the first channel/mode may be retransmitted through the second channel/mode while being reassigned with sequence number 2. In this case, the frame which is received through the second channel/mode and corrected to have sequence number 13 is previously stored in the reordering buffer 30 and thus discarded. Therefore, this process produces no problem.

Further, similarly, there is no problem when the frames having sequence numbers starting from 11 in the first channel/mode are sequentially retransmitted through the second channel/mode. For example, when the frame having sequence number 11 is reassigned with sequence number 0 in the second channel/mode, the difference therebetween is −11. In the wireless terminal on the receiving side, the reordering buffer 30 has previously increased the minimum expected frame sequence number to sequence number 12, which shows that the corrected sequence number 11 is smaller than the minimum expected frame sequence number 12. Accordingly, the frame having sequence number 11 is discarded and no problem is produced.

As stated above, no problem is produced even if a previously received frame is retransmitted, but it is desirable to transmit them setting the above retry bit in order to explicitly show the possibility of duplicate reception.

In this way, as in the case of FIG. 9 used in the first embodiment, a frame without reception confirmation by the wireless terminal on the receiving side can be also retransmitted through the changed channel/mode.

When generally expressing the process in the present embodiment, if notified that the difference in sequence number between the channel/mode before change and that after change is Δ (−11 in the above example,) the process realizing that "sequence number−Δ" is performed on the frame received through the channel/mode after change. In the above explanation, the difference is determined based on the channel/mode before change, but the basis to be used is not questioned as long as similar correction can be performed in the end. For example, if the channel/mode after change is set as the basis, the difference in the example is not −11 but 11, and thus the correction process realizing that "sequence number+Δ" is performed on the frame received through the channel/mode after change.

When the difference between the sequence numbers assigned by the transceiver before change and the sequence numbers assigned by the transceiver after change is known (fixed, for example) before changing the channel/mode, the information concerning the difference may be previously notified to the wireless terminal on the receiving side, instead of notifying by the change notification frame. For example, if the differential value is notified when establishing the settings for the Block Ack mechanism between the wireless terminal on the transmitting side and the wireless terminal on the receiving side, the information concerning the difference can be additionally notified in the exchange of setting frames. When the length of the setting frame is limited on a byte basis for example, it is considered that there is an unused field (reserved field). If such a field can be utilized, communication efficiency can be improved.

When receiving the channel/mode change notification frame, the wireless terminal on the receiving side performs the above explained correction process using the previously notified differential value.

(Effect of Fifth Embodiment)

According to the present embodiment, by notifying the differential value between the transmission starting sequence number of the frame to be transmitted by the transceiver after change and the sequence number of the frame assigned by the transceiver before change, the frame which cannot be retransmitted by the transceiver after change (through the channel/mode after change) in the first embodiment can be retransmitted (note that, in the first embodiment, only the frames dropped with successive sequence numbers continuing to the sequence number of an untransmitted frame can be retransmitted). For example, even a frame which is discontinuously lost or a frame whose reception at the wireless terminal on the receiving side is unconfirmed can be retransmitted through the changed channel/mode.

By receiving the notification of the above differential value, the wireless terminal on the receiving side can correct the sequence numbers of the received frames, and thus can rearrange the frames retransmitted through the channel/mode after change in the correct order (even if the dropped frames are not those with successive sequence numbers continuing to the sequence number of an untransmitted frame).

When the difference between the sequence numbers assigned by the transceiver before change and the sequence numbers assigned by the transceiver after change is known, the information concerning the difference can be previously notified to the wireless terminal on the receiving side in the exchange of setting frames etc., instead of notifying by the change notification frame. Communication efficiency can be improved by writing the information in an unused field of the setting frame, for example.

(Sixth Embodiment)

Since a sixth embodiment is based on the first embodiment, hereinafter, a difference from the first embodiment will be mainly explained.

In the first embodiment, the wireless terminal has a common address when transmitting and receiving data between different channels/modes. The sixth embodiment is different from the first embodiment in that the address of a wireless terminal is changed in each channel/mode (namely, in each transceiver corresponding thereto). In the IEEE 802.11 wireless LAN, the address of a wireless terminal is a MAC address and is included in any one of address fields in the frame format of FIG. 4.

Or the difference is that in the first embodiment, the data frame to be switched between different channels/modes has a common traffic type (TID), while, in the present embodiment, a different TID is assigned in each channel/mode.

First, explanation will be given on the case where the address of the wireless terminal is changed in each channel/mode.

In this case, the wireless terminal on the receiving side is notified of the address of an wireless terminal corresponding to each channel/mode. This notification may be written in the channel/mode change notification frame. It is desirable that the address of an wireless terminal corresponding to each channel/mode is notified when performing the setting for exchanging frames between the wireless terminals, and the channel/mode change notification frame may be used for confirmation.

For example, in the IEEE 802.11 wireless LAN, when connecting a wireless base station and a wireless terminal as shown in FIG. 2, first, the following frames are exchanged: Authentication frames as an Authentication process and an Association Request frame and an Association Response frame as an Association process. Any one of the exchange processes is used to notify the address of the wireless terminal corresponding to each channel/mode (the order for performing the Authentication process and the Association process depends on whether or not to perform security setting, or what kind of security setting should be performed.) It is considered suitable that this notification should be given in the Association process, in which frames are exchanged to notify the capability of the wireless terminals (including the wireless base station). Further, in the IEEE 802.11 wireless LAN, this notification may be given in a process called Direct Link Setup performed when the wireless terminals which are not wireless base stations directly communicate with each other under a wireless base station for example. Furthermore, this notification can be given in the process of Block Ack setting for exchanging actual data frames, which enables the wireless terminals to notify each other even when there is no wireless base station therebetween as shown in FIG. 1.

When this notification is given through one channel/mode (channel/mode before change), the address of the wireless terminal in the channel/mode used for the notification is known. Thus, such a notification field for the address used in the current channel/mode may be intentionally omitted, while, the information concerning the MAC address of another corresponding channel/mode is notified.

Further, in the IEEE 802.11 wireless LAN, when a BSS is formed under a wireless base station as shown in FIG. 2, an ID in the BSS is assigned through the Association process when establishing connection to the wireless base station (an ID assigned through the Association process is called an Association ID (AID)). Since the ID such as in a wireless communication group, which is a BSS, for example, is shorter than the MAC address (here, the ID is not limited to the AID intentionally, and used as an expediential identification ID of the wireless terminal in a certain communication group), this can be efficiently used instead of the MAC address of the wireless terminal when there is another information concerning the wireless communication group. It is also possible to notify the correspondence between the MAC address and the channel/mode set for such an ID in the wireless communication group.

When being notified of the address of the wireless terminal corresponding to each channel/mode, the wireless terminal on the receiving side arranges a scoreboard in the transceiver corresponding to each channel/mode, and transmits a BA frame using the address of the wireless terminal corresponding to each channel/mode. Note that each transceiver (each address of the wireless terminal) uses a common reordering buffer, and when data frames having different (direct) transmission source addresses are passed from each transceiver, these data frames are regarded as data frames from the same wireless terminal and stored in the common reordering buffer.

Next, explanation will be given on the case where each channel/mode assigns a different traffic type (TID).

In the IEEE 802.11 wireless LAN, the TID is set through mapping directly by the priority parameter in the MA-UNITDATA.request primitive by which the LLC layer instructs the MAC layer to transmit data and thus generally, it is hardly possible that the TID is different in each channel/mode. However, when changing the TID in each channel/mode due to each channel/mode having different properties in transmission environment or difference in handling QoS policy, the interrelationship between the TIDs in different channels/modes may be notified in a similar method used when the address of the wireless terminal is different in each channel/mode.

(Effect of Sixth Embodiment)

According to the present embodiment, even if each channel/mode assigns a different address for a wireless terminal or a different traffic type, by employing the above notification method, the wireless terminal on the receiving side can rearrange the data frames in the correct order when the channel/mode to transmit data frames is changed.

(Seventh Embodiment)

A seventh embodiment is similar to the first to sixth embodiments in that the sequence number is separately assigned in each channel/mode, but different from these embodiments in that a reordering buffer is separately arranged in each channel/mode. In the explanation of the present embodiment, a common address for a wireless terminal is used in each channel/mode, and a common TID is assigned in each channel/mode, but different addresses and TIDs can be used by employing a method as in the sixth embodiment.

Figure 11:
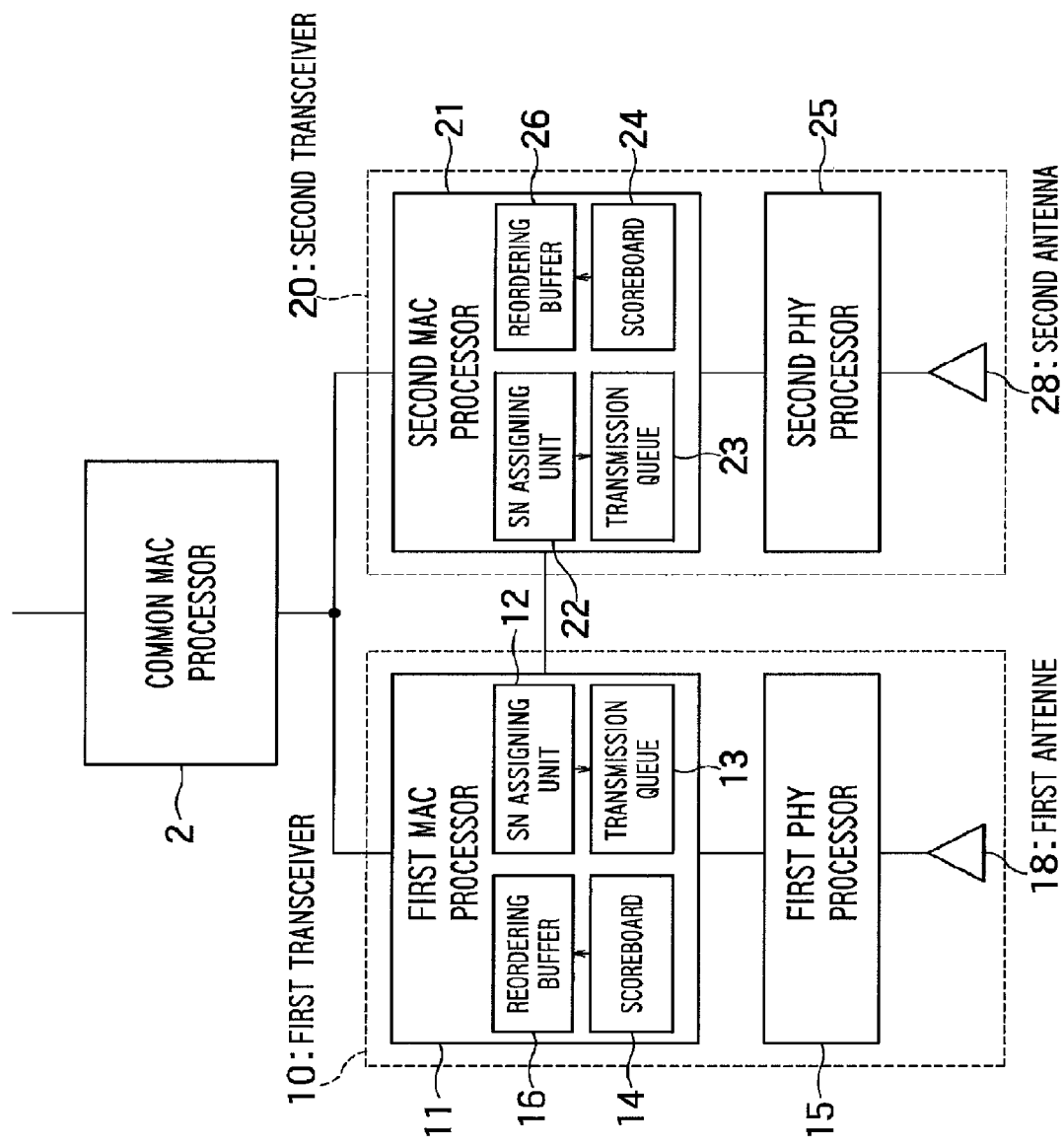
FIG. 11 is a diagram showing a structural example of a wireless terminal according to a seventh embodiment.

The structure of the wireless terminal in the seventh embodiment is as shown in FIG. 11, in comparison with the structure show in FIG. 6 of the first embodiment. FIG. 11 is different from FIG. 6 in that the reordering buffer is removed from the common MAC processor 2, and reordering buffers 16 and 26 are arranged in the MAC processors 11 and 21 respectively. The drawing shows that the scoreboards 14 and 24 are connected to the reordering buffers 16 and 26 respectively, which expresses the simplified flow of received data frames, and other processors (such as a process block for detecting and discarding duplicate received frames or a process block for security) may be arranged therebetween.

The operation of the seventh embodiment will be explained using FIG. 12, which corresponds to FIG. 8 in the first embodiment. Since the operation of the wireless terminal on the transmitting side is similar to the first embodiment, the operation of the wireless terminal on the receiving side will be mainly explained.

The wireless terminal on the receiving side correctly receives the frames having sequence numbers 11 and 13, and transmits a BA frame as a delivery confirmation response. The received frames having sequence numbers 11 and 13 are passed to the reordering buffer 16 (described as "first reordering buffer" in FIG. 12) in the first MAC processor 11, and the frame having sequence number 11 is passed to the common MAC processor 2 and further passed to the upper layer. Thus, the reordering buffer 16 starts to wait from the frame having sequence number 12.

When receiving a channel/mode change notification frame, the wireless terminal on the receiving side passes the received frame (here, the frame having sequence number 13) stored in the reordering buffer 16 in the first MAC processor 11, which corresponds to the channel/mode before change, to the common MAC processor 2 in order to further pass it to the upper layer. Here, the reordering buffer 16 in the first MAC processor 11 is reset since it does not further receive a frame having the same traffic type (TID) from the same wireless terminal.

By using the reordering buffer 16 after reset for other frames, the resource (memory in the main) in the wireless terminal is effectively used. Further, as in the first embodiment, the scoreboard 14 in the first MAC processor 11 may be reset. By receiving the change notification frame, the minimum expected frame sequence number in the reordering buffer 26 in the second MAC processor 21 is set to 1 which is the starting sequence number described in the change notification frame. Here, as shown in FIG. 12, by switching the first reordering buffer 16 to the second reordering buffer 26 to pass data frames to the upper layer, frames can be more surely passed to the upper layer in the correct order.

After that, when the wireless terminal on the receiving side receives the frames having sequence numbers 1 and 2 (corresponding to sequence numbers 14 and 15 in the first channel/mode respectively) through the second channel/mode, these frames are passed to the upper layer through the reordering buffer 26 in the second MAC processor 21. As a result, the frames having sequence numbers 11, 13, 14, and 15 in terms of the first channel/mode can be passed to the upper layer in the correct order.

In the wireless terminal structure of FIG. 11, a common reordering buffer can be further arranged in the common MAC processor 2. In this case, when receiving the change notification frame, all received frames in the reordering buffer of the MAC processor before change are passed to the upper layer through the common reordering buffer, and then the minimum expected frame sequence number in the common reordering buffer and that in the reordering buffer of the MAC processor after change are both set using the value in the change notification frame.

(Effect of Seventh Embodiment)

According to the present embodiment, the wireless terminal on the receiving side can receive the frames transmitted through different channels/modes in the correct order, even if an individual reordering buffer is used in each channel/mode.

(Eighth Embodiment)

Since an eighth embodiment is based on the seventh embodiment, hereinafter, a difference from the seventh embodiment will be mainly explained.

As the fourth embodiment is different from the first embodiment, the eighth embodiment is different from the seventh embodiment in that the transmission starting sequence number in the channel/mode after change is set to a default value. Thus, also in the eighth embodiment, similarly to the fourth embodiment, the change notification frame for notifying the transmission starting sequence number can be omitted.

Figure 12:
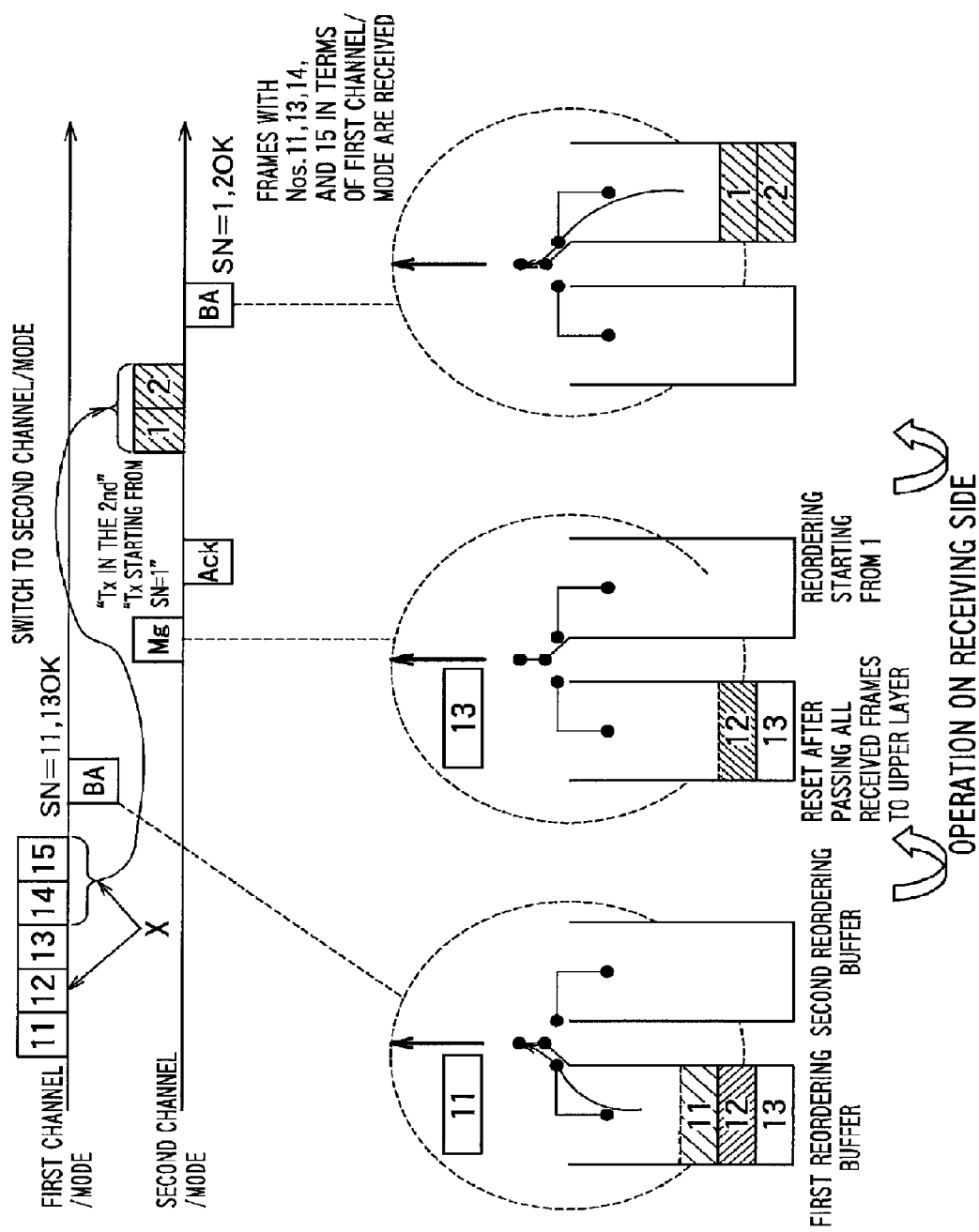
FIG. 12 is a diagram explaining an operation example of the seventh embodiment.

That is, in FIG. 12 used in the seventh embodiment, there is no need to notify the information concerning the starting sequence number ("Tx starting from SN=1") in the channel/mode after change in the change notification frame expressed as "Mg". The structure of the wireless terminal is similar to the seventh embodiment as shown in FIG. 11, and the operation of the wireless terminal when receiving and transmitting data is similar to the fourth embodiment.

(Effect of Eighth Embodiment)

According to the present embodiment, even when an individual reordering buffer is arranged in each of the first transceiver and the second transceiver in the wireless terminal on the receiving side, the wireless terminal on the receiving side can perform the receiving process corresponding to the change of transceiver, without being notified of the transmission starting sequence number in the transceiver after change.

(Ninth Embodiment)

Since a ninth embodiment is based on the seventh embodiment, hereinafter, a difference from the seventh embodiment will be mainly explained.

Similarly to the difference between the fifth embodiment and the first embodiment, the ninth embodiment is different from the seventh embodiment in that notifying the difference between the transmission starting sequence number and the sequence number in the channel/mode before change corresponding to the frame whose transmission is started through the channel/mode after change, instead of notifying the transmission starting sequence number for the channel/mode after change.

Figure 13:
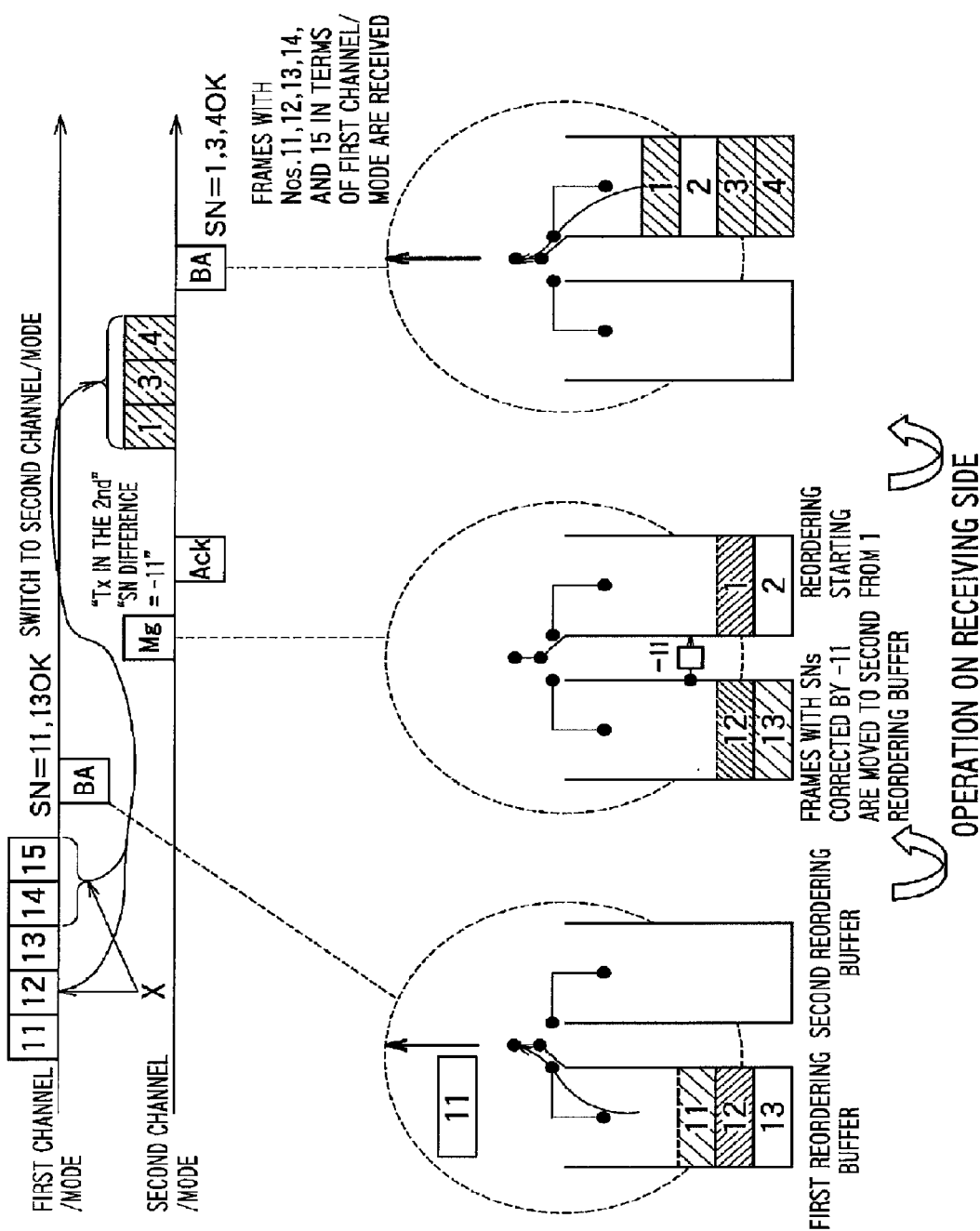
FIG. 13 is a diagram explaining an operation example of a ninth embodiment.

The operation of the ninth embodiment will be explained using FIG. 13. Since the operation of the wireless terminal on the transmitting side is similar to the fifth embodiment, the explanation thereof will be omitted.

When receiving a change notification frame, the wireless terminal on the receiving side corrects the frames of the reordering buffer 16 in the first MAC processor 11 before change by using the difference in sequence number (−11 in this case), and moves them to the reordering buffer 26 in the second MAC processor 21 after change.

That is, since the reordering buffer 16 in the first MAC processor 11 has previously received the frame having sequence number 13 and is expecting the frame having sequence number 12, the frame having sequence number 13 is corrected by the above notified differential value and moved to the reordering buffer 26 in the second MAC processor 21. Further, the minimum expected frame sequence number in the reordering buffer 26 is set to the value (here, 1) obtained by correcting the current minimum sequence number in the reordering buffer 16 by the above differential value. As a result, the reordering buffer 26 has previously received the frame having sequence number 2 and is expecting the frame having sequence number 1. It is desirable to reset the reordering buffer 16 and scoreboard 14 in the first MAC processor 11 before change, considering the resource in the wireless terminal.

After that, when the wireless terminal on the receiving side receives the frames having sequence numbers 1, 3, and 4 through the second channel/mode, the frames having sequence numbers 1, 2, 3, and 4 are sequentially passed from the reordering buffer 26 in the second MAC processor 21 to the upper layer. As a result, all of the frames having sequence numbers 11, 12, 13, 14, and 15 in terms of the first channel/mode are received in the correct order.

(Effect of Ninth Embodiment)

According to the present embodiment, even when an individual reordering buffer is arranged in each of the first transceiver and the second transceiver in the wireless terminal on the receiving side, the sequence number of the received frame can be corrected by the above notified differential value, which makes it possible to rearrange the frames retransmitted through the channel/mode after change in the correct order (even if the dropped frames are not those with successive sequence numbers continuing to the sequence number of an untransmitted frame).

(Tenth Embodiment)

Since a tenth embodiment is based on the ninth embodiment, hereinafter, a difference from the ninth embodiment will be mainly explained.

As briefly described in the seventh embodiment, the tenth embodiment is different from the ninth embodiment in that an individual reordering buffer is arranged in each channel/mode and a common reordering buffer is further arranged in the common MAC processor 2.

The operation of the tenth embodiment will be explained using FIG. 14. Since the operation of the wireless terminal on the transmitting side is similar to the fifth embodiment, the explanation thereof will be omitted. Further, at the start of operation, the minimum expected frame sequence number in the reordering buffer of the common MAC processor 2 is set to the same value as the minimum expected frame sequence number in the reordering buffer 16.

Figure 14:
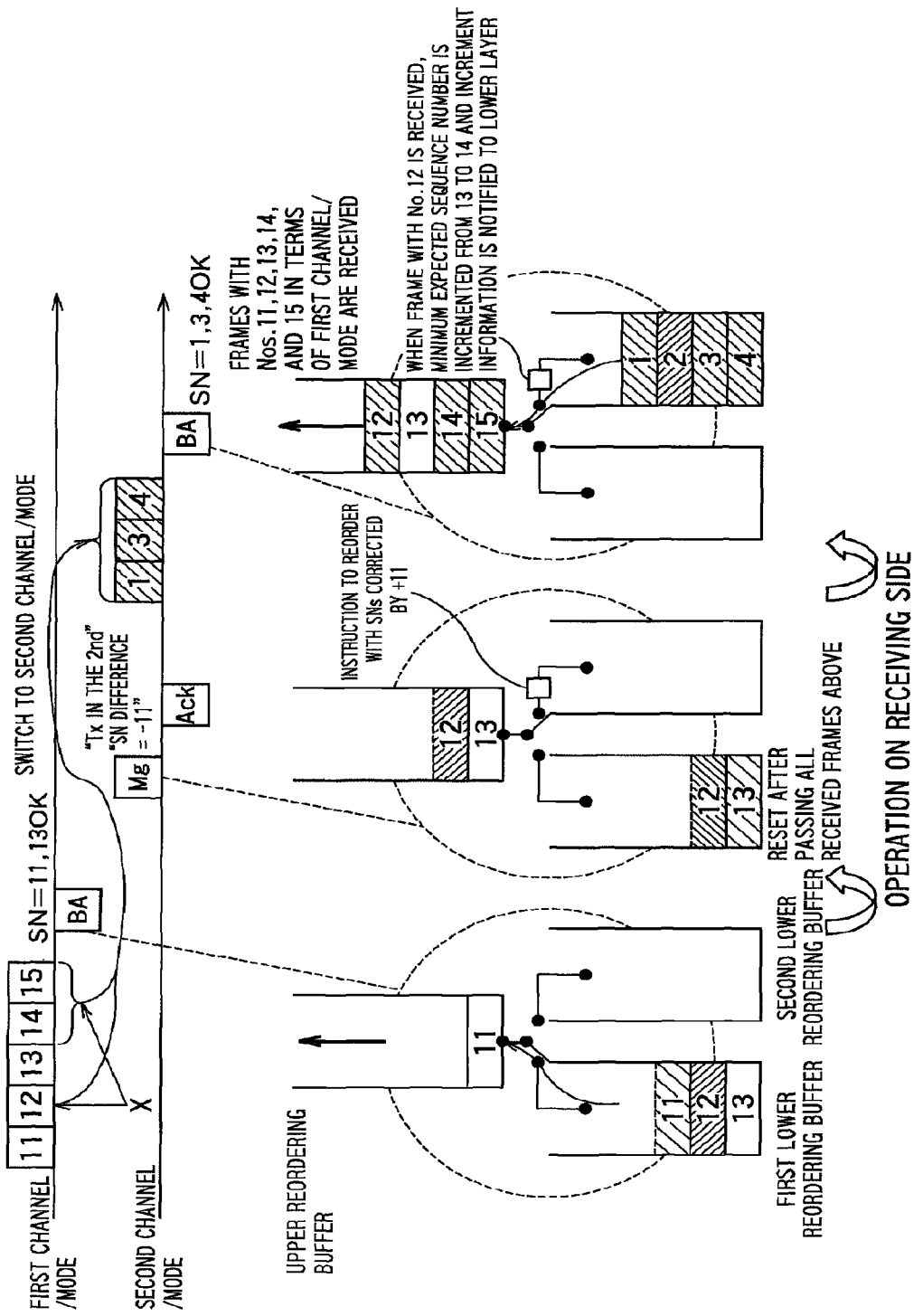
FIG. 14 is a diagram explaining an operation example of a tenth embodiment.

When receiving a change notification frame, the wireless terminal on the receiving side passes all received frames in the reordering buffer 16 of the first MAC processor 11 before change to the reordering buffer of the common MAC processor 2 (expressed "upper reordering buffer" in FIG. 14). Similarly to the seventh embodiment, the reordering buffer 16 in the first MAC processor 11 (expressed as "first lower reordering buffer" in FIG. 14) is reset and desirably used for other frames since it does not further receive a frame having the same traffic type (TID) from the same wireless terminal. In this way, the resource (memory in the main) in the wireless terminal can be effectively used.

Further, the minimum expected frame sequence number in the reordering buffer 26 of the second MAC processor 21 after change (expressed as "second lower reordering buffer" in FIG. 14) is set. Concretely, it is set to the same value as the value from correcting the minimum expected frame sequence number in the reordering buffer of the common MAC processor 2 (or in the reordering buffer 16) by the differential value notified in the above change notification frame (here, 12−11=1.) Then, when passing received frames from the reordering buffer 26 in the second MAC processor 21 after change to the common MAC processor 2, their sequence numbers are corrected in a reversed way by the differential value (here, −11) shown in the change notification frame.

After that, when the frames having sequence numbers 1, 3, and 4 are received through the second channel/mode, the frame having sequence number 1 is passed from the reordering buffer 26 in the second MAC processor 21 to the common MAC processor 2 as a frame having sequence number 12 ((1−(−11), namely 1+11). The common MAC processor 2 receives the frame having sequence number 12, and passes, to the upper layer, the frame having sequence number 12 and the frame having sequence number 13 previously received through the first MAC processor 11, and increments the minimum expected frame sequence number to 14.

The value obtained by correcting this minimum expected frame sequence number 14 by the differential value (14−11=3) is set as the minimum expected frame sequence number in the reordering buffer of the second MAC processor 21. Thus, the reordering buffer 26 in the second MAC processor 21 skips expecting the frame having sequence number 2. Since the frame having sequence number 3 has been previously received, the frames having sequence numbers 3 and 4 are sequentially changed to have sequence numbers 14 and 15 respectively and passed to the reordering buffer of the common MAC processor 2.

Since the minimum expected frame sequence number in the reordering buffer of the common MAC processor 2 is 14, the frames having sequence numbers 14 and 15 are passed to the next process forwarding them to the upper layer.

As a result, all of the frames having sequence numbers 11, 12, 13, 14, and 15 in terms of the first channel/mode are received in the correct order.

(Effect of Tenth Embodiment)

According to the present embodiment, even when the terminal is configured so that an individual reordering buffer is arranged in each of the first transceiver and the second transceiver and a common reordering buffer is further arranged in the upper layer, the frames retransmitted through the channel/mode after change can be rearranged in the correct order (even if the dropped frames are not those with successive sequence numbers continuing to the sequence number of an untransmitted frame).

(Eleventh Embodiment)

An eleventh embodiment is different from the first to sixth embodiments in that common sequence numbers are used in different channels/modes. Clearly, common TID is assigned in these channels/modes. Further, explanation is made under the assumption that the address of each wireless terminal is commonly used in these channels/modes When common sequence numbers are used in different channels/modes, it is hardly possible that the address of an wireless terminal is different in each channel/mode. However, by employing a method similar to the sixth embodiment, the address of an wireless terminal can be changed in each channel/mode.

Figure 15:
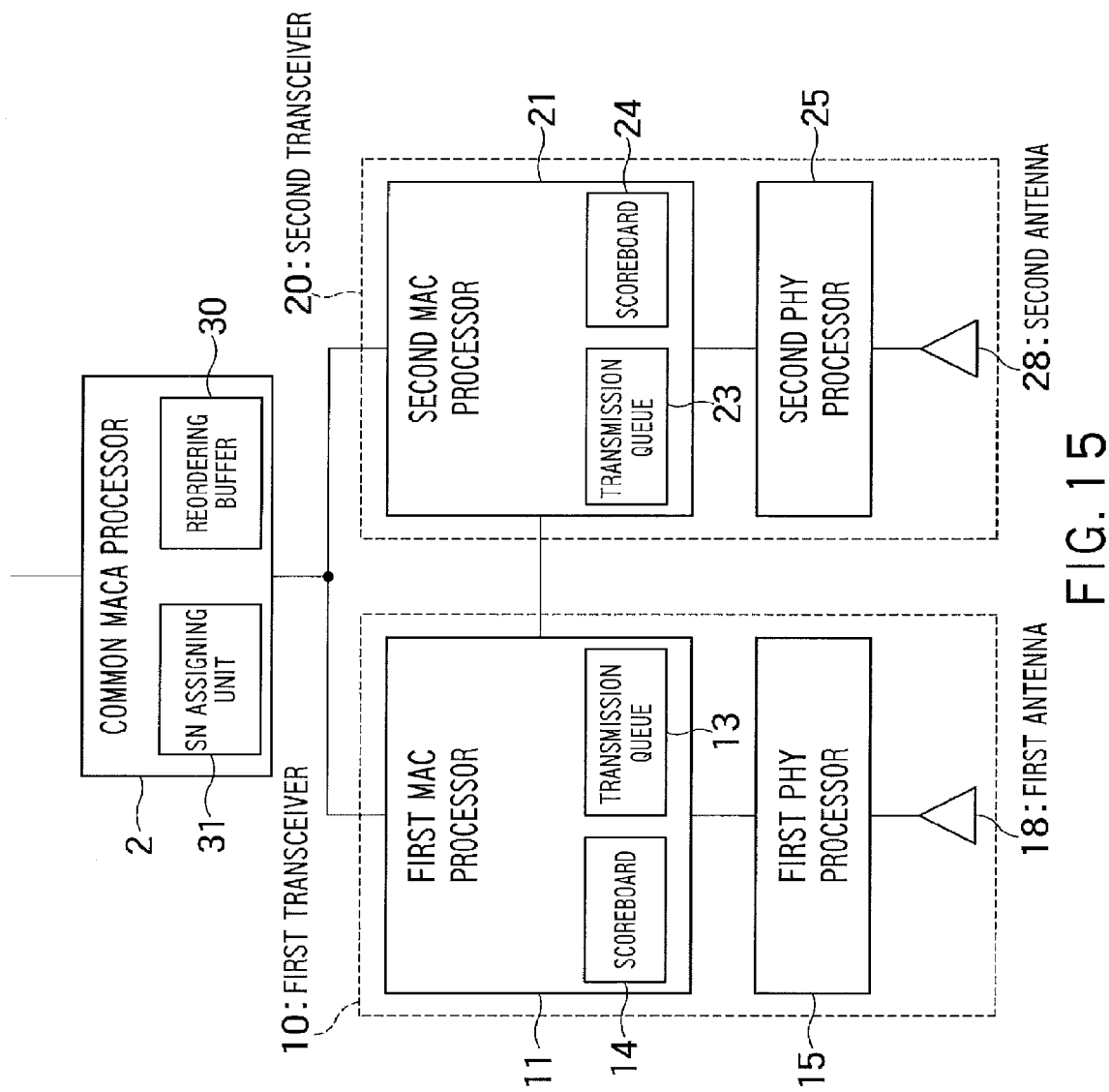
FIG. 15 is a diagram showing a structural example of a wireless terminal according to an eleventh embodiment.

The structure of the wireless terminal is as shown in FIG. 15, in comparison with FIG. 6 in the first embodiment. The common MAC processor 2 has a sequence number assigning unit 31, and a transmission frame is assigned with a sequence number by the assigning unit 31 and allocated to the first MAC processor 11 or the second MAC processor 21. When changing the transmission source of the frame between the first MAC processor 11 and the second MAC processor, the frame in the transmission queue of the MAC processor before change is moved to the transmission queue of the MAC processor after change while holding the previously assigned sequence number.

Figure 16:
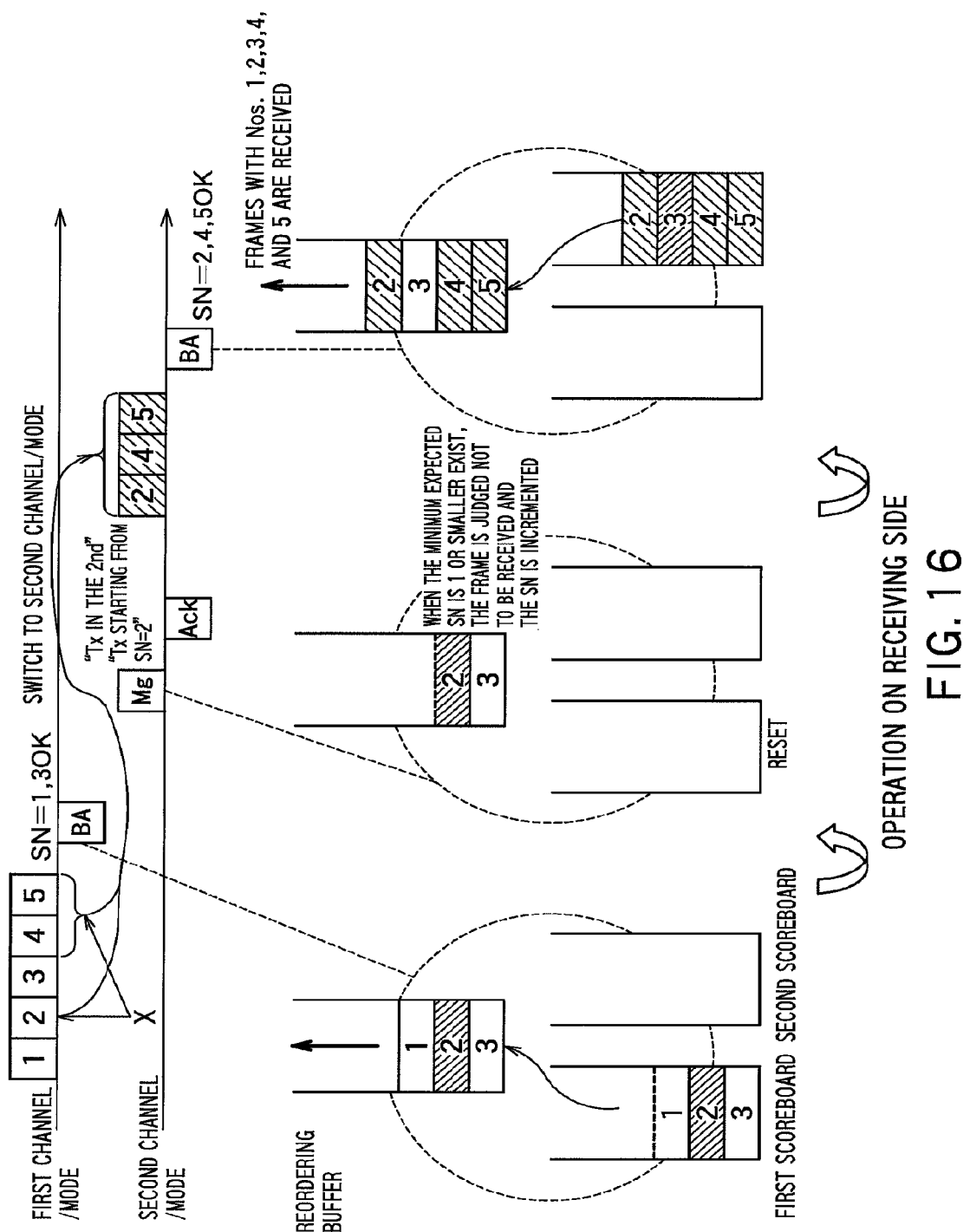
FIG. 16 is a diagram explaining an operation example of the eleventh embodiment.

The operation of the eleventh embodiment will be explained using FIG. 16.

The wireless terminal on the transmitting side transmits the frames having sequence numbers 1 to 5 through the first channel/mode.

The wireless terminal on the transmitting side receives a BA frame notifying that the frames having sequence numbers 1 and 3 are received by the wireless terminal on the receiving side, and determines to transmit the frames having sequence numbers 2, 4, and 5 through the second channel/mode. Here, the sequence number of each frame is not changed and is the same as the value used in the first channel/mode. The wireless terminal on the transmitting side transmits a change notification frame in order to change the channel/mode for transmitting the frames. The change notification frame includes the information showing that frames will be transmitted through the second channel/mode and that transmission is started from the frame having sequence number 2.

When receiving the change notification frame, the wireless terminal on the receiving side judges whether the minimum expected frame sequence number in the reordering buffer 30 of the common MAC processor 2 is smaller than the sequence number written in the change notification frame. If smaller, the frame corresponding thereto is judged not to be transmitted after the channel/mode is changed, and the minimum expected frame sequence number is incremented by one. If the frame having the incremented sequence number has been previously received, it is passed to the upper layer, and the minimum expected frame sequence number is further incremented. If the incremented sequence number is smaller than the sequence number written in the change notification frame again, the same process as described above is performed.

Further, it is desirable that the wireless terminal on the receiving side resets the scoreboard 14 of the first MAC processor 11 before change. By resetting the scoreboard 14, the reset scoreboard 14 can be utilized for receiving a frame from another wireless terminal or a frame having another TID, as in the first embodiment.

Further, as described in the first embodiment, when a method called partial state BA in IEEE 802.11n is employed, if there is no empty scoreboard available to retain reception status when receiving a new frame from the wireless terminal, the scoreboard currently retaining the status can be reset and used. However, when a plurality of scoreboards are arranged in the partial state BA, by previously resetting the scoreboard judged not to be used anymore as described above, the selection algorithm for selecting the scoreboard to be reset can be simplified by determining that the currently unused scoreboard should be preferentially selected.

After that, when receiving the frames having sequence numbers 2, 4, and 5 from the wireless terminal on the transmitting side through the second channel/mode after change, the wireless terminal on the receiving side returns a BA frame showing that these frames are received, and passes the received frames from the second MAC processor 21 after change to the reordering buffer 30 of the common MAC processor 2. The reordering buffer passes the frames in the order of the frame having sequence number 2, the frame having sequence number 3 previously received through the first channel/mode, . . . to the upper layer (here, LLC layer). As a result, in this case, the frames having sequence numbers 1, 2, 3, 4, and 5 are sequentially received.

(Effect of Eleventh Embodiment)

According to the present embodiment, when frames assigned with common sequence numbers are transmitted from different transceivers, a transceiver change notification frame is transmitted to the wireless terminal on the receiving side, by which the wireless terminal on the receiving side can effectively use its memory by releasing the buffer (scoreboard) corresponding to the frequency band/channel unused. Further, the wireless terminal on the receiving side previously grasps, from the change notification frame, the sequence number corresponding to the frame not to be transmitted from the wireless terminal on the transmitting side, by which no perception gap in terms of transmission status is generated between the transmitting side and the receiving side, and the receiving side can be made to be in an optimum expecting state.

(Twelfth Embodiment)

Since a twelfth embodiment is based on the eleventh embodiment, hereinafter, a difference from the eleventh embodiment will be mainly explained.

The twelfth embodiment is different from the eleventh embodiment in that a reordering buffer is arranged in each transceiver corresponding to a different channel/mode.

Figure 17:
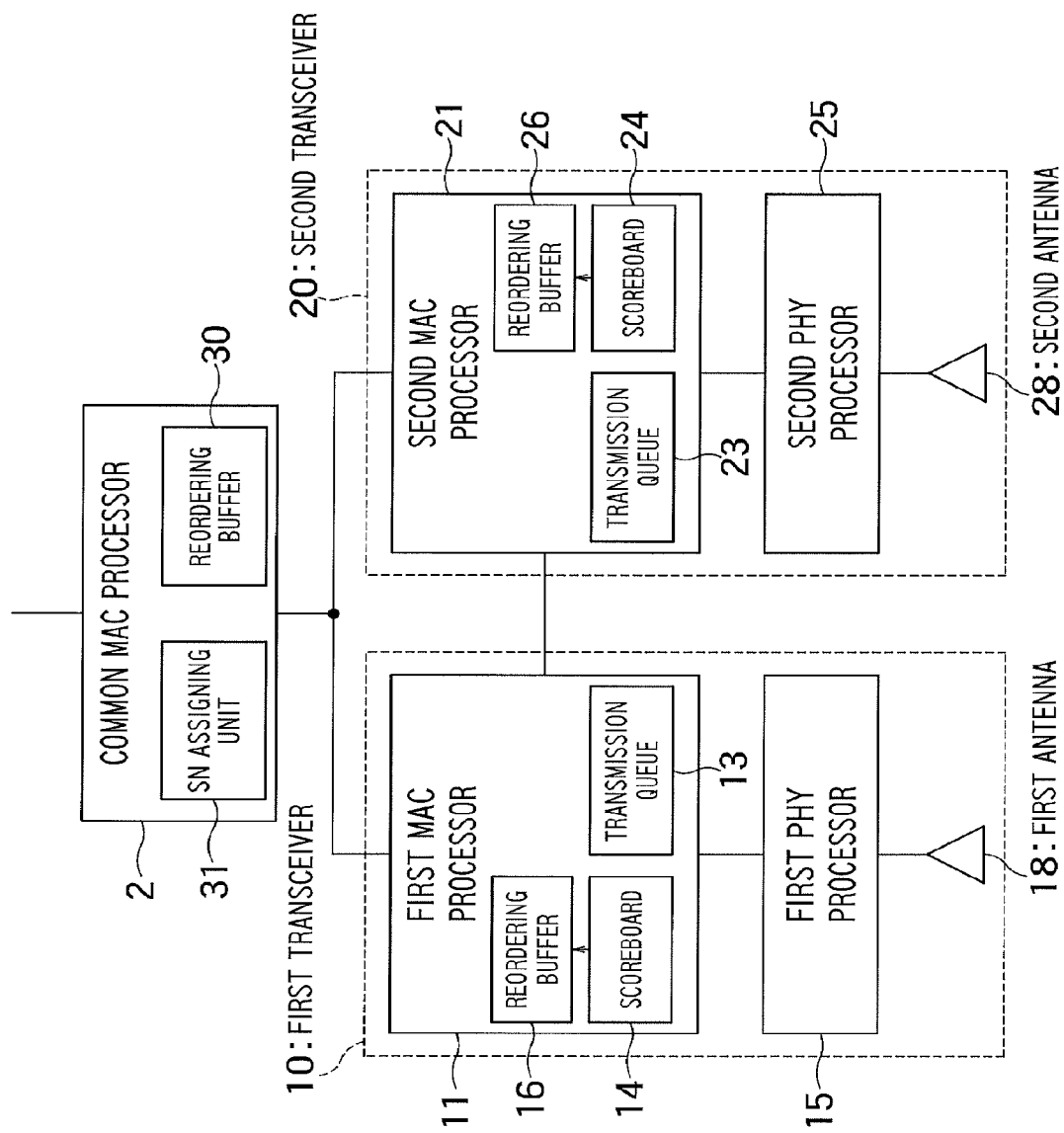
FIG. 17 is a diagram showing a structural example of a wireless terminal according to a twelfth embodiment.

The structure of the wireless terminal is as shown in FIG. 17. Compared to the wireless terminal structure of FIG. 15 in the eleventh embodiment, the reordering buffers 16 and 26 are additionally arranged in the first MAC processor 11 and the second MAC processor 21 respectively.

How the wireless terminal on the receiving side performs the process for rearranging frames in the order of the sequence number will be explained using FIG. 18. Since the operation of the wireless terminal on the transmitting side is similar to the eleventh embodiment, the explanation thereof will be omitted.

Figure 18:
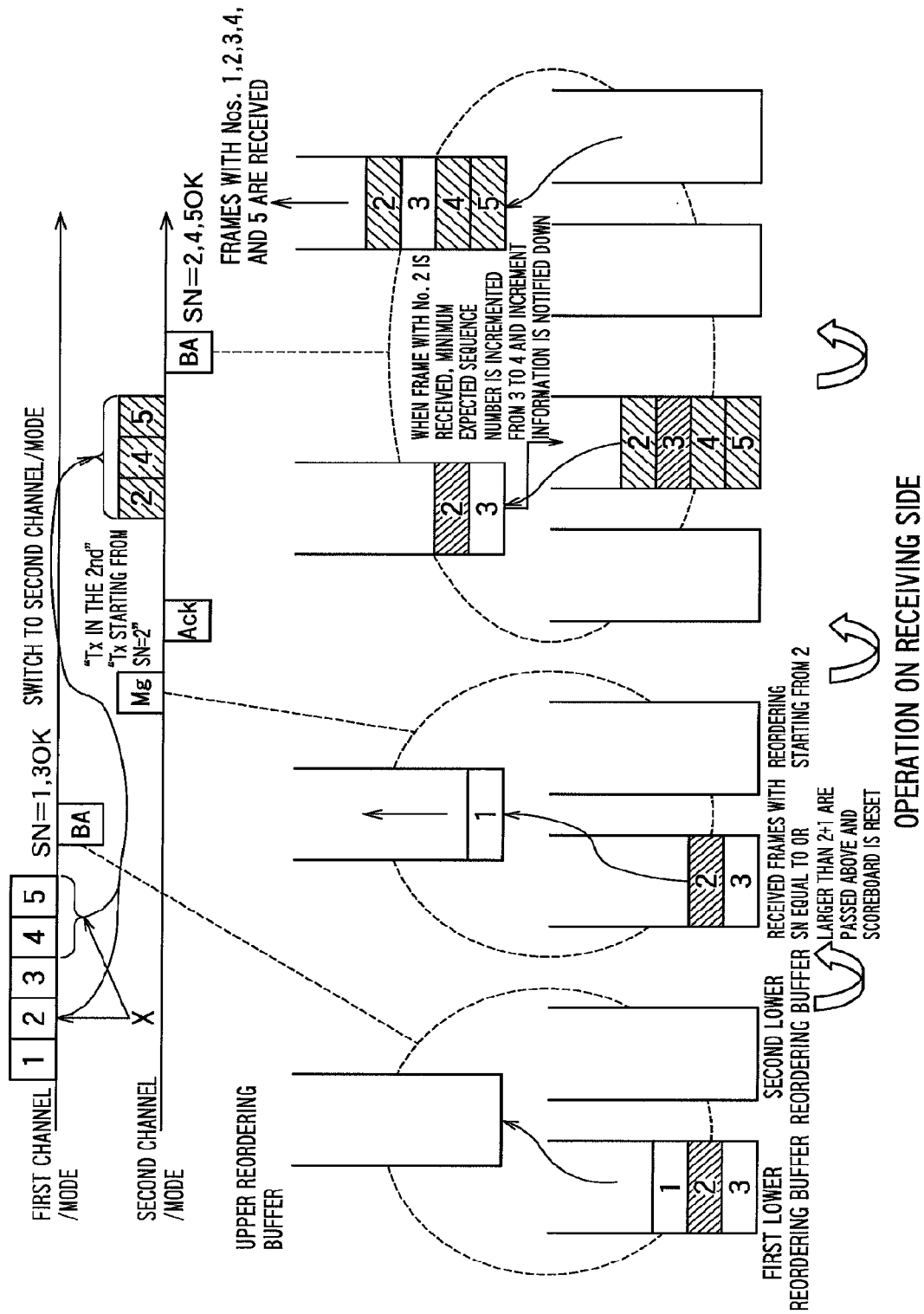
FIG. 18 is a diagram explaining an operation example of the twelfth embodiment.

The wireless terminal on the receiving side passes the frames sequentially received by the reordering buffer 16 of the first MAC processor 11 (expressed as "first lower reordering buffer" in FIG. 18) to the reordering buffer 30 of the common MAC processor 2 (expressed as "upper reordering buffer" in FIG. 18). That is, the frames sequentially received by the lower reordering buffer are passed to the reordering buffer in the upper layer. (The same can be applied to the other embodiments when the MAC processors and common MAC processor have their respective reordering buffers.)

When receiving a channel/mode change notification frame, the wireless terminal on the receiving side passes the frame having sequence number which is equal to or larger than the sequence number notified by the change notification frame plus 1 from the reordering buffer 16 of the first MAC processor 11 before change to the reordering buffer 30 of the common MAC processor 2. It is desirable that the scoreboard 14 of the first MAC processor 11 is correspondingly reset as in the other embodiments. Further, the minimum expected frame sequence number in the reordering buffer 26 of the second MAC processor 21 (expressed as "second lower reordering buffer" in FIG. 18) is set to the sequence number notified by the change notification frame. In the above example, the frame having sequence number which is equal to or larger than the notified sequence number plus 1 is passed, but the frame having sequence number which is simply equal to or larger the notified sequence number may be passed to the reordering buffer 30 of the common MAC processor 2, since no problem is produced by duplicate reception.

After that, when the frames having sequence numbers 2, 4, and 5 are received through the second channel/mode after change, the frame having sequence number 2 is stored in the reordering buffer 30 of the common MAC processor 2, and then the frame having sequence number 2 and the frame having sequence number 3 previously received through the first channel/mode are passed from the reordering buffer 30 to the upper layer (LLC layer). Thus, the minimum expected frame sequence number in the reordering buffer 30 of the common MAC processor 2 becomes 4.

Similarly to the tenth embodiment, this updated minimum sequence number 4 is set as the minimum expected frame sequence number in the reordering buffer 26 of the second MAC processor 21.

In the present embodiment, differential correction as in the tenth embodiment is not required. Thus, the frames having sequence numbers 4 and 5 are sequentially passed from the reordering buffer 26 in the second MAC processor 21 to the reordering buffer 30 of the common MAC processor 2. As a result, the frames having sequence numbers 1, 2, 3, 4, and 5 are sequentially received.

(Effect of Twelfth Embodiment)

According to the present embodiment, when frames assigned with common sequence numbers are transmitted from different transceivers and the terminal is configured to have a reordering buffer in each of the transceivers and in the common MAC processor in the upper layer, by transmitting a transceiver change notification frame to the wireless terminal on the receiving side, the wireless terminal on the receiving side can effectively use its memory by releasing the buffer (scoreboard) corresponding to the frequency band/channel unused. Further, the wireless terminal on the receiving side previously grasps, from the change notification frame, the sequence numbers corresponding to the frames further not transmitted from the wireless terminal on the transmitting side, by which no perception gap in terms of transmission status is generated between the transmitting side and the receiving side, and the receiving side can be made to be in an optimum expecting state.

(Thirteenth Embodiment)

Since a thirteenth embodiment is based on the eleventh embodiment, hereinafter, a difference from the eleventh embodiment will be mainly explained.

The thirteenth embodiment is different from the eleventh embodiment in that an individual reordering buffer is arranged in each transceiver, instead of arranging a common reordering buffer.

Figure 19:
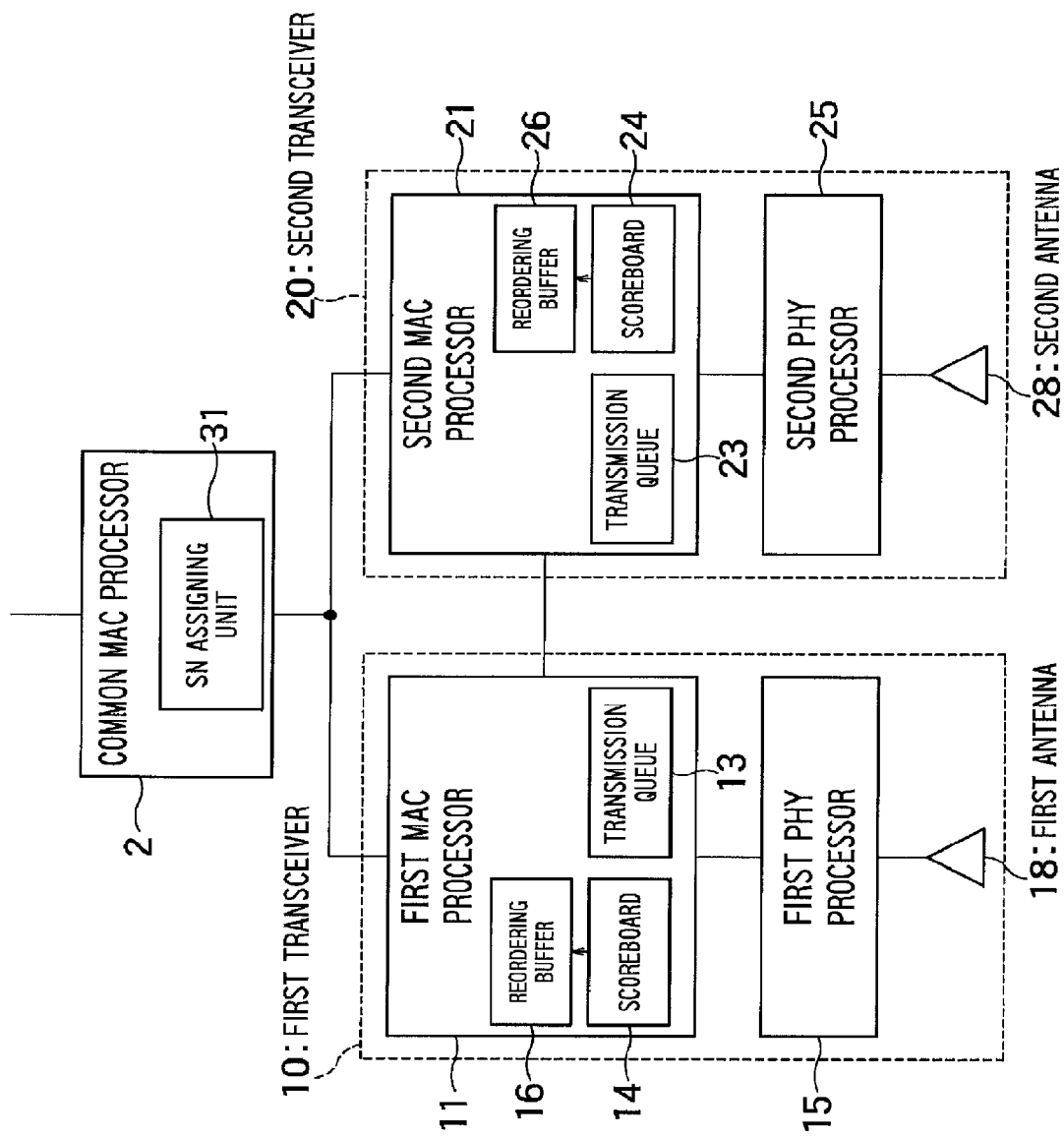
FIG. 19 is a diagram showing a structural example of a wireless terminal according to a thirteenth embodiment.

The structure of the wireless terminal of the present embodiment is as shown in FIG. 19. The common MAC processor 2 does not have a reordering buffer, and the first MAC processor 11 and the second MAC processor 21 have their respective reordering buffers.

Figure 20:
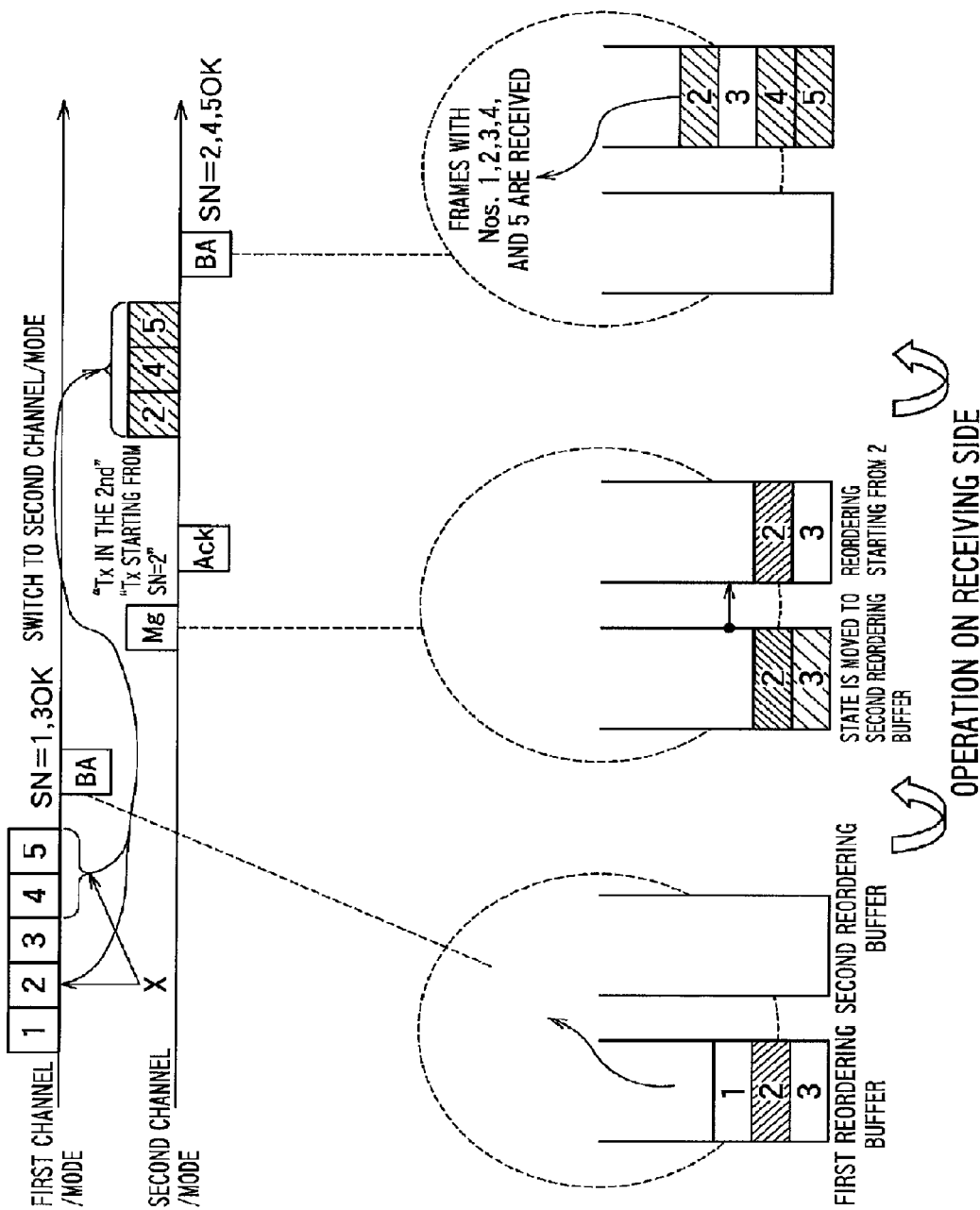
FIG. 20 is a diagram explaining an operation example of the thirteenth embodiment.

The frame receiving operation performed by such a wireless terminal will be explained using FIG. 20. Since the operation of the wireless terminal on the transmitting side is similar to the eleventh embodiment, the explanation thereof will be omitted.

When receiving the frames having sequence numbers 1 and 3 through the first channel/mode, the wireless terminal on the receiving side passes the frame having sequence number 1 from the reordering buffer 16 of the first MAC processor 11 to the upper layer. The reordering buffer 16 retains the frame having sequence number 3 while kept expecting the frame having sequence number 2.

Here, similarly to the ninth embodiment, when receiving a channel/mode change notification frame, the state of the reordering buffer 16 in the first MAC processor 11 before change is moved to the reordering buffer 26 in the second MAC processor 21 after change. More specifically, received frames having sequence numbers smaller than that notified in the change notification frame (here, 2) are passed to the upper layer, and then the state of the reordering buffer 16 (namely, frames having sequence numbers larger than the transmission starting sequence number, and the minimum expected sequence number) is moved to the reordering buffer 26 in the second MAC processor 21 after change.

As previously stated, after that, it is desirable that the reordering buffer 16 and the scoreboard 14 of the first MAC processor 11 before change are reset. Differently from the ninth embodiment, in the present embodiment, there is no need to correct the sequence numbers of the frames. The minimum expected frame sequence number in the reordering buffer 26 of the second MAC processor 21 after change becomes 2 in FIG. 20.

After that, when the frames having sequence numbers 2, 4, and 5 are received through the second channel/mode, the received frames are stored in the reordering buffer 26 of the second MAC processor 21, and sequentially passed to the upper layer. As a result, the frames having sequence numbers 1, 2, 3, 4, and 5 are sequentially received.

(Effect of Thirteenth Embodiment)

According to the present embodiment, when the terminal is configured to transmit frames assigned with common sequence numbers from different transceivers each having a reordering buffer, by transmitting a transceiver change notification frame from the wireless terminal on the transmitting side, the wireless terminal on the receiving side can rearrange received frames in the correct order. Further, by releasing the buffer (reordering buffer, scoreboard) corresponding to the frequency band/channel unused in the wireless terminal on the receiving side, its memory can be effectively used. Further, the wireless terminal on the receiving side previously grasps, from the change notification frame, the sequence numbers corresponding to the frames further not transmitted from the wireless terminal on the transmitting side, by which no perception gap in terms of transmission status is generated between the transmitting side and the receiving side, and the receiving side can be made to be in an optimum expecting state.

(Fourteenth Embodiment)

Since a fourteenth embodiment is based on the first to thirteenth embodiments, hereinafter, an additional feature to the first to thirteenth embodiments will be mainly explained.

The additional feature of the fourteenth embodiment compared to the first to thirteenth embodiments is that the first transceiver 10 and the second transceiver 20 of the wireless terminal are a millimeter-wave transceiver and a microwave transceiver respectively.

Here, the millimeter wave is electromagnetic wave having a wavelength of millimeter (mm) order in the frequency band of 30 GHz to 300 GHz. As a concrete millimeter-wave transmission/reception circuit, it is a transmission/reception circuit for electromagnetic waves in the frequency band of 57-66 GHz, for example.

Here, the microwave is electromagnetic wave having a wavelength of centimeter (cm) or greater order, for example, in the frequency band of 300 MHz to 30 GHz. As a concrete microwave transmission/reception circuit, it is a transmission/reception circuit for electromagnetic waves in the frequency band of 5 GHz or 2.4 GHz, for example.

Particularly in millimeter-wave communication, it can be considered that omni-directional transmission/reception cannot be performed depending on the design of the antenna and the transmission/reception will be quasi-omni-directional. In such a case, the situation will be that transmission/reception can be omnidirectionaly performed when using millimeter waves, but the direction of transmission/reception is limited when using microwaves.

In the present embodiment, in the wireless terminal of FIG. 6 used in the first embodiment, the first transceiver serves as a millimeter-wave transceiver, and the second transceiver serves as a microwave transceiver, as stated above.

However, the structure is not limited thereto, and the first transceiver may be a 5-GHz-band transceiver while the second transceiver may be a 2.4-GHz-band transceiver, for example.

Generally, the higher the frequency band, the larger the electromagnetic wave (radio wave) attenuation corresponding to distance. The wireless terminal in the embodiment of the present invention is a wireless terminal having at least two electromagnetic wave transceivers which are different from each other in frequency band, namely in radio wave attenuation characteristics, or in coverage area.

For example, a transceiver corresponding to the frequency band having lower communication frequency and less radio wave attenuation, namely having broader coverage area, is used as the second transceiver, and a transceiver corresponding to the frequency band having higher communication frequency and greater radio wave attenuation, namely having narrower coverage area, is used as the first transceiver.

Generally, it is easier for higher frequency band to secure broader band and higher transmission rate can be expected, while it is difficult for lower frequency band to secure broader band and results in only covering narrower band to have lower transmission rate. In view of these characteristics, the second transceiver may be a transceiver capable of covering a broad communication area but involuntarily using a narrow frequency band and producing low transmission rate, while the first transceiver may be a transceiver covering a narrow communication area but capable of using a broad frequency band and producing high transmission rate.

In such a case, the channel/mode change notification frame is transmitted from the second transceiver.

(Effect of Fourteenth Embodiment)

According to the present embodiment, when the first transceiver and the second transceiver have different characteristics in wireless communication by using different frequency bands etc., the change notification frame is transmitted from a transceiver which can more reliably establish a communication link, by which the notification can be surely transmitted to the wireless terminal on the receiving side.

(Fifteenth Embodiment)

Since a fifteenth embodiment is based on the first to fourteenth embodiments, hereinafter, an additional feature to the first to fourteenth embodiments will be mainly explained.

The additional feature of the fifteenth embodiment compared to the first to fourteenth embodiments relates to how the wireless terminal on the transmitting side notifies transmission status to the upper layer.

Figure 21:
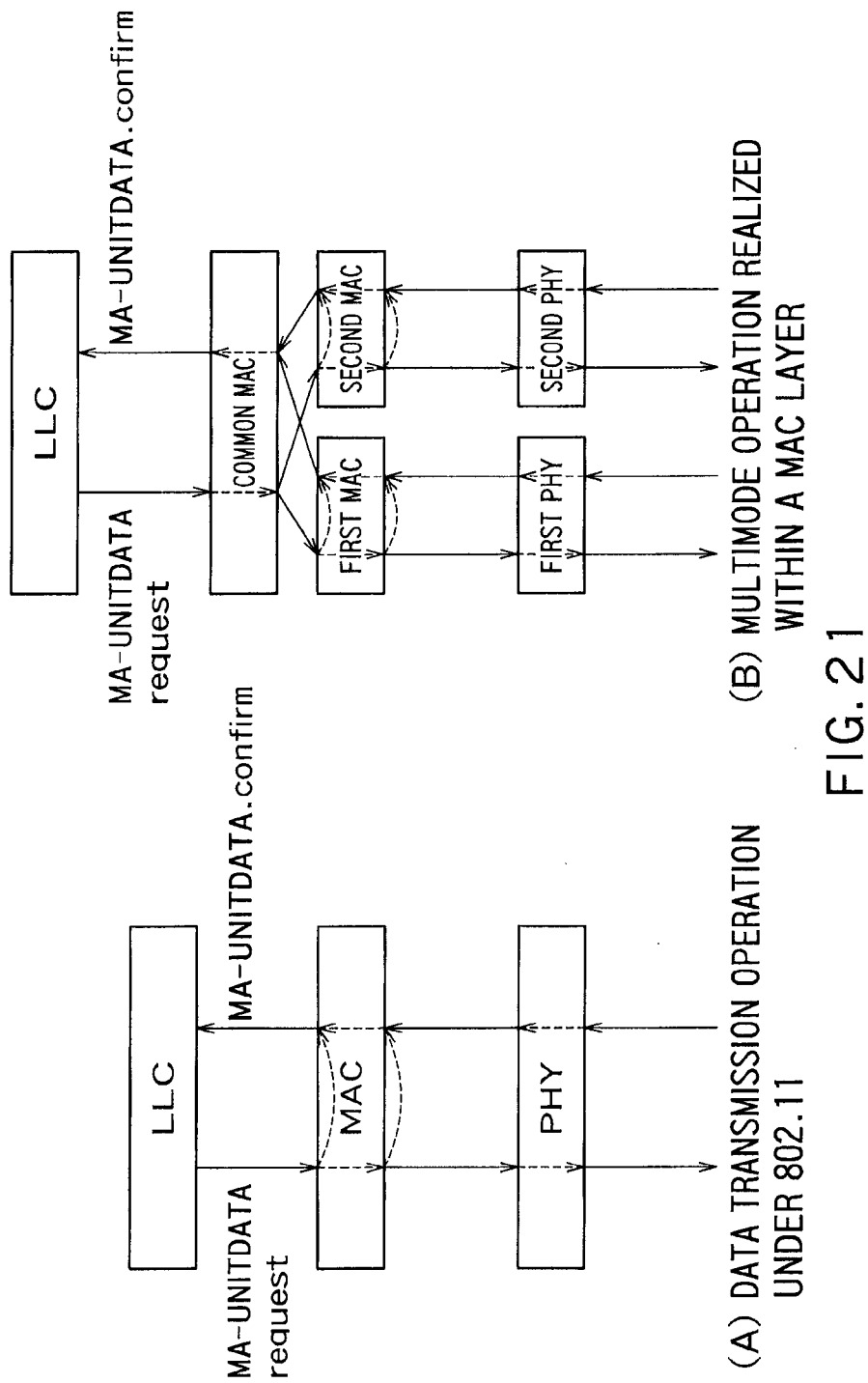
FIG. 21 is a diagram explaining an operation example according to a fifteenth embodiment.

Hereinafter, the present embodiment will be explained using FIG. 21.

As shown in FIG. 21(A), in the IEEE 802.11 wireless LAN, a primitive called MA-UNITDATA.request is used when data for transmission are passed from the upper layer (e.g., LLC layer) to the MAC layer. Further, the MAC layer notifies the transmission status of the data to the upper layer using a primitive called MA-UN ITDATA.confirm.

For example, the MAC layer firstly confirms whether the received data are transmittable data, and if not transmittable data, a unit in the upper stage of the MAC layer generates a MA-UNITDATA.confirm to notify the information to the upper layer.

Further, when the received data are intended to be transmitted by the MAC layer and requires no delivery confirmation response, the MAC layer performs a transmission process for the data, and notifies transmission success to the upper layer using the MA-UN ITDATA.confirm.

When the MAC layer receives a response concerning the data (including a response received after retransmission) requiring the delivery confirmation response, the MAC layer notifies transmission success to the upper layer using the MA-UN ITDATA.confirm.

When the MAC layer does not receive a response concerning the data requiring the delivery confirmation response even after performing retransmission for predetermined times, the MAC layer stops the transmission process and notifies transmission failure to the upper layer using the MA-UNITDATA.confirm.

Here, as shown in FIG. 21(B), the operation corresponding to a plurality of channels/modes as in the above embodiments (when realizing multimode operation within a MAC layer) will be considered.

For example, in the multichannel/multimode wireless terminal having the first MAC processor and the second MAC processor separated from each other, the MA-UNITDATA.confirm is issued when it is certain that either one of the first MAC processor and the second MAC processor stops transmission itself (without performing transmission through another channel/mode), or successfully performs transmission (and receives a delivery confirmation response if required).

(Effect of Fifteenth Embodiment)

According to the present embodiment, when the wireless terminal corresponds to a plurality of channels/modes within a MAC layer, a notification of transmission status can be passed back in response to the data transmission request from the upper layer.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

EXPLANATIONS OF REFERENCE NUMERAL

2: common MAC processing unit (frame allocating unit)
10: first transceiver (first communication unit)
20: second transceiver (second communication unit)
11: first MAC processing unit
12: sequence number assigning unit (first sequence number assigning unit)
13: transmission queue (first transmission queue)
14: scoreboard (first reception status storage)
15: first PHY processor
16: reordering buffer (first individual reordering buffer)
18: first antenna
21: second MAC processor
22: sequence number assigning unit (second sequence number assigning unit)
23: transmission queue
24: scoreboard (second reception status storage)
25: second PHY processing unit
26: reordering buffer (second individual reordering buffer)
28: second antenna
30: reordering buffer (common reordering buffer)
31: sequence number allocating unit
201, 202: wireless terminal (including a wireless base station)
101: wireless base station

The invention claimed is:

1. A wireless terminal, comprising:
frame allocating circuitry configured to perform an allocation process on data frames destined to another wireless terminal;
first communication circuitry configured to transmit a data frame destined to the other wireless terminal through a first channel, a receiver media access control (MAC) address of the data frame transmitted by the first communication circuitry being a first MAC address; and
second communication circuitry configured to transmit a data frame destined to the other wireless terminal through a second channel, a receiver MAC address of the data frame transmitted by the second communication circuitry being a second MAC address, the second MAC address being different from the first MAC address, wherein
each of the data frames is assigned a sequence number,
in the allocation process, the frame allocating circuitry allocates one or more of the data frames to be transmitted, to the first communication circuitry,
when a transmission channel to be used between the wireless terminal and the other wireless terminal is changed from the first channel to the second channel, a first notification notifying that the transmission channel is to be changed from the first channel to the second channel and a transmission starting sequence number are transmitted, wherein
the transmission starting sequence number is a sequence number of a data frame whose transmission is started by the second communication circuitry after the first notification, and is transmitted before the data frame assigned the transmission starting sequence number, and
the frame allocating circuitry switches an allocation destination of the data frames destined to the other wireless terminal from the first communication circuitry to the second communication circuitry.

2. The wireless terminal of claim 1, wherein the first notification is transmitted by a change notification frame.

3. The wireless terminal of claim 1, further comprising a first antenna, wherein the first communication circuitry and the second communication circuitry are configured to communicate via the first antenna.

4. The wireless terminal of claim 1, further comprising a first antenna and a second antenna, wherein the first communication circuitry is configured to communicate via the first antenna and the second communication circuitry is configured to communicate via the second antenna.

5. The wireless terminal according to claim 1, wherein the transmission starting sequence number is a sequence number which the second communication circuitry assigns to a data frame at a head of a transmission queue in the first communication circuitry.

6. The wireless terminal according to claim 5, wherein the data frame at the head of the transmission queue is any one of a new data frame or a retransmitted data frame.

7. The wireless terminal according to claim 1, wherein a frequency band of the first channel does not overlap with a frequency band of the second channel.

8. A wireless communication method, comprising:
performing an allocation process on data frames destined to another wireless terminal;
transmitting by a first communication circuitry a data frame destined to the other wireless terminal through a first channel, a receiver media access control (MAC) address of the data frame being a first MAC address; and
transmitting a data frame destined to the other wireless terminal through a second channel, a receiver MAC address of the data frame being a second MAC address, the second MAC address being different form the first MAC address,
wherein the method further includes:
assigning each of the data frames a sequence number,
allocating, in the allocation process, one or more of the data frames destined to the other wireless terminal to the first communication circuitry,
transmitting, when a transmission channel to be used between a wireless terminal and the other wireless terminal is changed from the first channel to the second channel, a first notification notifying that the transmission channel is to be changed from the first channel to the second channel and a transmission starting sequence number, wherein the transmission starting sequence number is a sequence number of a data frame whose transmission is started by a second communication circuitry after the first notification, and is transmitted before the data frame assigned the transmission starting sequence number, and switching an allocation destination of the data frames destined to the other wireless terminal from the first communication circuitry to the second communication circuitry.

9. The wireless communication method of claim 8, wherein the first notification is transmitted by a change notification frame.

10. The wireless communication method according to claim 8, wherein communication by the first communication circuitry and the second communication circuitry are performed via a first antenna.

11. The wireless communication method according to claim 8, wherein communication by the first communication circuitry is performed via a first antenna and communication by the second communication circuitry is performed via a second antenna.

12. The wireless communication method according to claim 8, wherein the transmission starting sequence number is a sequence number which the second communication circuitry assigns to a data frame at a head of a transmission queue in the first communication circuitry.

13. The wireless communication method according to claim 12, wherein the data frame at the head of the transmission queue is any one of a new data frame or a retransmitted data frame.

14. The wireless communication method according to claim 8, wherein a frequency band of the first channel does not overlap with a frequency band of the second channel.

15. A wireless terminal communicating with another wireless terminal which switches a channel between a first channel and a second channel and performs reception through one of the first channel and the second channel, comprising:
frame allocating circuitry configured to perform an allocation process on data frames to be transmitted;
first communication circuitry configured to transmit a data frame through the first channel; and
second communication circuitry configured to transmit a data frame through the second channel, wherein
each of the data frames is assigned a sequence number,
in the allocation process, the frame allocating circuitry allocates one or more of the data frames to be transmitted, to the first communication circuitry,
when a transmission channel is changed from the first channel to the second channel, a first notification notifying that the transmission channel is to be changed from the first channel to the second channel and a transmission starting sequence number are transmitted to the other wireless terminal, wherein
the transmission starting sequence number is a sequence number of a data frame whose transmission is started by the second communication circuitry after the first notification, and is transmitted before the data frame assigned the transmission starting sequence number, and
the frame allocating circuitry switches an allocation destination from the first communication circuitry to the second communication circuitry and
the first notification causes the other wireless terminal to switch the channel to the second channel and wait for the data frame assigned the transmission starting sequence number.

16. The wireless terminal according to claim 15, wherein a frequency band of the first channel does not overlap with a frequency band of the second channel.

17. A wireless communication method communicating with another wireless terminal which switches a channel between a first channel and a second channel and performs reception through one of the first channel and the second channel, comprising:
performing an allocation process on data frames to be transmitted;
transmitting by a first communication circuitry a data frame through the first channel; and
transmitting a data frame through the second channel,
wherein the method further includes:
assigning each of the data frames a sequence number,
allocating, in the allocation process, one or more of the data frames to be transmitted to the first communication circuitry,
transmitting, when a transmission channel is changed from the first channel to the second channel, a first notification notifying that the transmission channel is to be changed from the first channel to the second channel and a transmission starting sequence number to the other wireless terminal, wherein the transmission starting sequence number is a sequence number of a data frame whose transmission is started by a second communication circuitry after the first notification, and is transmitted before the data frame assigned the transmission starting sequence number, and
switching an allocation destination from the first communication circuitry to the second communication circuitry, and
the first notification causes the other wireless terminal to switch the channel to the second channel and wait for the data frame assigned the transmission starting sequence number.

18. The wireless communication method according to claim 17, wherein a frequency band of the first channel does not overlap with a frequency band of the second channel.

* * * * *